(12) United States Patent
Nandakumar et al.

(10) Patent No.: US 12,143,465 B2
(45) Date of Patent: Nov. 12, 2024

(54) SEARCHING OVER ENCRYPTED MODEL AND ENCRYPTED DATA USING SECURE SINGLE- AND MULTI-PARTY LEARNING BASED ON ENCRYPTED DATA

(71) Applicant: International Business Machines Corporation, Armonk, NY (US)

(72) Inventors: Karthik Nandakumar, Singapore (SG); Nalini K. Ratha, Yorktown Heights, NY (US); Shai Halevi, Elmsford, NY (US); Sharathchandra Pankanti, Darien, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 810 days.

(21) Appl. No.: 16/415,125

(22) Filed: May 17, 2019

(65) Prior Publication Data
US 2020/0366459 A1    Nov. 19, 2020

(51) Int. Cl.
*H04L 9/00*      (2022.01)
*G06F 21/62*      (2013.01)
*G06N 20/00*      (2019.01)

(52) U.S. Cl.
CPC .......... *H04L 9/008* (2013.01); *G06F 21/6245* (2013.01); *G06N 20/00* (2019.01); *H04L 2209/46* (2013.01)

(58) Field of Classification Search
None
See application file for complete search history.

(56) References Cited

U.S. PATENT DOCUMENTS 5,623,548 A * 4/1997 Akiyama .............. H04L 9/0662
                                                     380/28
6,084,874 A * 7/2000 Nguyen ................ H04L 47/781
                                                     370/352
(Continued)

FOREIGN PATENT DOCUMENTS

WO      2017134269 A1      2/2017
WO      2018102861 A1      6/2018
(Continued)

OTHER PUBLICATIONS https://en.wikipedia.org/wiki/Statistical_significance (Year: 2024).*
(Continued)

*Primary Examiner* — Shin-Hon (Eric) Chen
*Assistant Examiner* — Thomas A Carnes
(74) *Attorney, Agent, or Firm* — Steven M. Bouknight

(57) ABSTRACT

ML model(s) are created and trained using training data from user(s) to create corresponding trained ML model(s). The training data is in FHE domains, each FHE domain corresponding to an individual one of the user(s). The trained machine learning model(s) are run to perform inferencing using other data from at least one of the user(s). The running of the ML model(s) determines results. The other data is in a corresponding FHE domain of the at least one user. Using at least the results, it is determined which of the following issues is true: the results comprise objectionable material, or at least one of the trained ML model(s) performs prohibited release of information. One or more actions are taken to take to address the issue determined to be true. Methods, apparatus, and computer program product are disclosed.

17 Claims, 12 Drawing Sheets

(56) References Cited

U.S. PATENT DOCUMENTS

| | | | |
|---|---|---|---|
| 7,194,635 B1* | 3/2007 | Yoda | H04N 1/32251 713/193 |
| 7,856,100 B2 | 12/2010 | Wang et al. | |
| 8,539,220 B2 | 9/2013 | Raykova et al. | |
| 9,252,942 B2 | 2/2016 | Zhang et al. | |
| 9,819,650 B2 | 11/2017 | Soon-Shiong et al. | |
| 11,003,991 B2* | 5/2021 | Chabanne | G06N 3/08 |
| 11,087,223 B2 | 8/2021 | Nandakumar et al. | |
| 11,343,068 B2 | 5/2022 | Nandakumar | |
| 2007/0140479 A1 | 6/2007 | Wang et al. | |
| 2011/0078099 A1* | 3/2011 | Weston | G16B 40/20 706/12 |
| 2011/0264920 A1 | 10/2011 | Rieffel | |
| 2012/0078825 A1* | 3/2012 | Kulkarni | G06F 16/24578 706/12 |
| 2013/0167192 A1* | 6/2013 | Hickman | G06F 21/6245 726/1 |
| 2014/0140514 A1 | 5/2014 | Gentry | |
| 2015/0039912 A1* | 2/2015 | Payton | H04L 9/14 713/193 |
| 2016/0156595 A1* | 6/2016 | Wu | H04L 9/008 713/168 |
| 2016/0224803 A1* | 8/2016 | Frank | G06F 21/6245 |
| 2016/0350648 A1* | 12/2016 | Gilad-Bachrach | G06N 3/0481 |
| 2016/0350675 A1* | 12/2016 | Laks | G06N 20/00 |
| 2017/0039487 A1 | 2/2017 | Naganuma et al. | |
| 2017/0359321 A1 | 12/2017 | Rindal et al. | |
| 2017/0372226 A1* | 12/2017 | Costa | G06F 21/60 |
| 2018/0012139 A1* | 1/2018 | Schmid | G06Q 10/10 |
| 2018/0046475 A1* | 2/2018 | Wei | G06N 3/08 |
| 2018/0060759 A1* | 3/2018 | Chu | G06N 20/00 |
| 2018/0131512 A1 | 5/2018 | Gajek | |
| 2018/0144152 A1 | 5/2018 | Greatwood | |
| 2018/0255023 A1* | 9/2018 | Whaley | H04L 63/0421 |
| 2018/0349740 A1* | 12/2018 | Schneider | G06F 17/18 |
| 2018/0359078 A1* | 12/2018 | Jain | G06F 21/602 |
| 2019/0065974 A1 | 2/2019 | Michigami | |
| 2019/0073608 A1* | 3/2019 | Veeningen | G06N 20/00 |
| 2019/0227912 A1* | 7/2019 | Banuelos | G06N 20/00 |
| 2019/0244138 A1* | 8/2019 | Bhowmick | H04L 67/10 |
| 2019/0278895 A1* | 9/2019 | Streit | G06F 21/602 |
| 2019/0296910 A1 | 9/2019 | Cheung | |
| 2019/0332814 A1* | 10/2019 | Bos | G06F 21/64 |
| 2020/0019867 A1* | 1/2020 | Nandakumar | G06F 21/602 |
| 2020/0082259 A1* | 3/2020 | Gu | G06N 3/0454 |
| 2020/0082813 A1* | 3/2020 | Rudden | G06F 40/279 |
| 2020/0104636 A1* | 4/2020 | Halevi | G06V 10/454 |
| 2020/0125639 A1* | 4/2020 | Doyle | G06F 40/30 |
| 2020/0160095 A1* | 5/2020 | Weller | G06F 18/2148 |
| 2020/0233979 A1* | 7/2020 | Tahmasebi Maraghoosh | G06N 3/04 |
| 2020/0252198 A1* | 8/2020 | Nandakumar | H04L 9/008 |
| 2020/0366459 A1* | 11/2020 | Nandakumar | G06F 21/6245 |
| 2020/0380531 A1* | 12/2020 | Vaidya | G06N 3/088 |
| 2021/0121117 A1* | 4/2021 | Albert | A61B 5/7267 |
| 2021/0126945 A1* | 4/2021 | Muto | G06N 20/10 |
| 2021/0209247 A1* | 7/2021 | Mohassel | A63B 21/222 |
| 2021/0248176 A1* | 8/2021 | Pankanti | G06F 16/51 |

FOREIGN PATENT DOCUMENTS

| | | | |
|---|---|---|---|
| WO | WO-2018174873 A1 * | 9/2018 | G06F 21/62 |
| WO | WO-2019111007 A1 * | 6/2019 | G06F 16/2425 |

OTHER PUBLICATIONS https://en.wikipedia.org/wiki/Null_hypothesis (Year: 2024).*

Statistical Significance Steven Tenny Ibrahim Abdelgawad (Year: 2024).*

Bonte et al., "Privacy-preserving logistic regression training", BMC Medical Genomics 2018, vol. 11, (Suppl 4):86, 9 pages.

Chen et al., "Logistic regression over encrypted data from fully homomorphic encryption", BMC Medical Genomics 2018, vol. 11, (Suppl 4):81, 10 pages.

List of IBM Patents or Patent Applications Listed as Related, Jan. 10, 2024, 2 pages.

R. Agrawal and R. Srikant. Privacy-preserving data mining. In W. Chen, J. F. Naughton, and P. A. Bernstein, editors, Proceedings of the 2000 ACM SIGMOD International Conference on Management of Data, May 16-18, 2000, Dallas, Texas, USA., pp. 439-450. ACM, 2000.

M. Barni, C. Orlandi, and A. Piva. A privacy-preserving protocol for neural-network-based computation. In Proceedings of the 8th Workshop on Multimedia and Security, MM&Sec '06, pp. 146-151, New York, NY, USA, 2006. ACM.

D. Boneh, C. Gentry, S. Halevi, F. Wang, and D. J. Wu. Private database queries using somewhat homomorphic encryption. In ACNS, vol. 7954 of Lecture Notes in Computer Science, pp. 102-118. Springer, 2013.

Z. Brakerski. Fully homomorphic encryption without modulus switching from classical gapsvp. In R. Safavi-Naini and R. Canetti, editors, Crypto, vol. 7417 of Lecture Notes in Computer Science, pp. 868-886. Springer, 2012.

Z. Brakerski, C. Gentry, and V. Vaikuntanathan. (leveled) fully homomorphic encryption without boot-strapping. ACM Transactions on Computation Theory, 6(3):13, 2014.

A. Costache, N. P. Smart, S. Vivek, and A. Waller. Fixed-point arithmetic in SHE schemes. In SAC, vol. 10532 of Lecture Notes in Computer Science, pp. 401-422. Springer, 2016.

J. L. H. Crawford, C. Gentry, S. Halevi, D. Platt, and V. Shoup. Doing real work with FHE: the case of logistic regression. IACR Cryptology ePrint Archive, 2018:202, 2018.

C. Gentry. Fully homomorphic encryption using ideal lattices. In Proceedings of the 41st ACM Symposium on Theory of Computing—STOC 2009, pp. 169-178. ACM, 2009.

C. Gentry, S. Halevi, C. S. Jutla, and M. Raykova. Private database access with he-over-oram architecture. In ACNS, vol. 9092 of Lecture Notes in Computer Science, pp. 172-191. Springer, 2015.

C. Gentry, A. Sahai, and B. Waters. Homomorphic encryption from learning with errors: Conceptually-simpler, asymptotically-faster, attribute-based. In R. Canetti and J. A. Garay, editors, Advances in Cryptology—CRYPTO 2013, Part I, pp. 75-92. Springer, 2013.

R. Gilad-Bachrach, N. Dowlin, K. Laine, K. E. Lauter, M. Naehrig, and J. Wernsing. Cryptonets: Applying neural networks to encrypted data with high throughput and accuracy. In ICML, vol. 48 of JMLR Workshop and Conference Proceedings, pp. 201-210. JMLR.org, 2016.

Z. G. T. Gu and S. Garg. Safetynets: Verifiable execution of deep neural networks on an untrusted cloud. In Advances in Neural Information Processing Systems, NIPS '17, 2017.

S. Halevi and V. Shoup. HElib—An Implementation of homomorphic encryption. https://github.com/shaih/HElib/, Accessed Sep. 2014.

A. Khedr, P. G. Gulak, and V. Vaikuntanathan. Shield: scalable homomorphic implementation of encrypted data-classifiers. IEEE Trans. Computers, 65(9):2848-2858, 2016.

A. Kim, Y. Song, M. Kim, K. Lee, and J. H. Cheon. Logistic regression model training based on the approximate homomorphic encryption. Cryptology ePrint Archive, Report 2018/254, 2018. https://eprint.iacr.org/2018/254.

M. Kim, Y. Song, S. Wang, Y. Xia, and X. Jiang. Secure logistic regression based on homomorphic encryption: Design and evaluation. JMIR Med Inform, 6(2):e19, Apr. 2018. available from https://ia.cr/2018/074.

Y. LeCun, L. Bottou, Y. Bengio, and P. Haffner. Gradient-based learning applied to document recognition. Proceedings of the IEEE, 86(11):2278-2324, 1998.

Y. Lindell and B. Pinkas. Privacy preserving data mining. J. Cryptology, 15(3):177-206, 2002.

J. Liu, M. Juuti, Y. Lu, and N. Asokan. Oblivious neural network predictions via minionn transformations. In B. M. Thuraisingham, D. Evans, T. Malkin, and D. Xu, editors, Proceedings of the 2017 ACM SIGSAC Conference on Computer and Communications Security, CCS 2017, Dallas, TX, USA, Oct. 30-Nov. 3, 2017, pp. 619-631. ACM, 2017.

(56) References Cited

OTHER PUBLICATIONS

P. Mohassel and Y. Zhang. Secureml: A system for scalable privacy-preserving machine learning. In 2017 IEEE Symposium on Security and Privacy, SP 2017, San Jose, CA, USA, May 22-26, 2017, pp. 19-38. IEEE Computer Society, 2017.
V. Nikolaenko, U. Weinsberg, S. Ioannidis, M. Joye, D. Boneh, and N. Taft. Privacy-preserving ridge regression on hundreds of millions of records. In Security and Privacy (SP), 2013 IEEE Symposium on, pp. 334-348. IEEE, 2013.
C. Orlandi, A. Piva, and M. Barni. Oblivious neural network computing via homomorphic encryption. EURASIP J. Information Security, 2007, 2007.
M. S. Riazi, C. Weinert, O. Tkachenko, E. M. Songhori, T. Schneider, and F. Koushanfar. Chameleon: A hybrid secure computation framework for machine learning applications. In 13 ACM Asia Conference on Information, Computer and Communications Security (ASIACCS'18). ACM, Jun. 4-8, 2018. To appear. Preliminary version: http://ia.cr/2017/1164.
C. J. V. Vaikuntanathan and A. Chandrakasan. Gazelle: a low latency framework for secure neural network inference. In arXiv preprint, 2018.
S. Wang, Y. Zhang, W. Dai, K. Lauter, M. Kim, Y. Tang, H. Xiong, and X. Jiang. Healer: homomorphic computation of exact logistic regression for secure rare disease variants analysis in gwas. Bioinformatics, 32(2):211-218, 2016.
M. Zinkevich, M. Weimer, L. Li, and A. J. Smola. Parallelized stochastic gradient descent. 2010.
Hitaj, Briland, Giuseppe Ateniese, and Fernando Pérez-Cruz. "Deep models under the GAN: information leakage from collaborative deep learning." Proceedings of the 2017 ACM SIGSAC Conference on Computer and Communications Security. ACM, 201.
Makri, Eleftheria, et al. PICS: Private Image Classification with SVM. IACR Cryptology ePrint Archive 2017/1190, 2017.
Hardy, Stephen, et al. "Private federated learning on vertically partitioned data via entity resolution and additively homomorphic encryption." arXiv preprint arXiv:1711.10677 (2017).
Adriana L'opez-Alt, Eran Tromer, and Vinod Vaikuntanathan, "On-the-fly multiparty computation on the cloud via multikey fully homomorphic encryption", in Proceedings of STOC 2012, pp. 1219-1234. ACM, 2012.
Mukherjee, P. and Wichs, D., "Two round multiparty computation via multi-key FHE". In Annual International Conference on the Theory and Applications of Cryptographic Techniques (pp. 735-763), May 2016.
Gilad Asharov, Abhishek Jain, Adriana L'opez-Alt, Eran Tromer, Vinod Vaikuntanathan, and Daniel Wichs, "Multiparty computation with low communication, computation and interaction via threshold FHE", in Advances in Cryptology—EUROCRYPT 2012, pp. 483-501, 2012.
Nico Schlitter, "A Protocol for Privacy Preserving Neural Network Learning on Horizontally Partitioned Data", Faculty of Computer Science, Jan. 2008.
J.H.Cheon, M. Kim, M. Kim, "Search and Compute on Encrypted Data", In International Conference on Financial Cryptography and Data Security, 2015, 142-159, Springer.
J. Chen, Y. Liu, W. Wu, 2017 "Faster Binary Arithmetic Operations on Encrypted Integers", In WCSE'17, Proceedings of 2017 the 7th International Workshop on Computer Science and Engineering.
Yuan et al. "Privacy preserving back-propagation learning made practical with cloud computing." International Conference on Security and Privacy in Communication Systems. Springer, Berlin, Heidelberg, 2012.
Lopez-Alt et al. "On-the-fly multiparty computation on the cloud via multikey fully homomorphic encryption." Proceedings of the forty-fourth annual ACM symposium on Theory of computing. ACM, 2012.
Peter et al. "Efficiently outsourcing multiparty computation under multiple keys." IEEE transactions on information forensics and security 8.12 (2013): 2046-2058.
Patel et al. "Comparative evaluation of elliptic curve cryptography based homomorphic encryption schemes for a novel secure multiparty computation." Journal of Information Security 5.01 (Jan. 2014).

\* cited by examiner

```
nn.Sequential{
  [input -> (1) -> (2) -> ... -> (7) -> output]
  (1): nn.Reshape(64)
  (2): nn.Linear(64 -> 32)
  (3): nn.Sigmoid
  (4): nn.Linear(32 -> 16)
  (5): nn.Sigmoid
  (6): nn.Linear(16 -> 10)
  (7): nn.Sigmoid
}
```

SEARCHING OVER ENCRYPTED MODEL AND ENCRYPTED DATA USING SECURE SINGLE-AND MULTI-PARTY LEARNING BASED ON ENCRYPTED DATA

BACKGROUND

This invention relates generally to machine learning and encryption and, more specifically, relates to secure multi-party learning and inferring insights based on encrypted data.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

Advances in machine learning and its efficacy are leading to increased adoption by a wide variety of industries and applications. There are emerging technologies around providing services for the following:

Training: Learn models from domain specific "training" data samples provided by the end-users; and Inferencing: Given learnt models and new data, infer insights from new data.

Additionally, many groups within the same agency have data but they are not allowed to share it among themselves. Many competitors have similar data but not enough for each one of them to benefit from machine learning. (e.g., banks, governments).

While inferencing, it is desirable to not depend upon multiple parties, both for sensitivity (e.g., all parties will know the volume of business) and for SLA (service level agreement) requirements (e.g., a rogue multiparty intentionally delaying, sabotaging, or otherwise interfering with inference flow).

Furthermore, when appropriate, legitimate, and warranted, authorized personnel should be able to search the data and model. It is therefore desirable to jointly learn better models in the encrypted domain, such as by using combined data from multiple collaborators and without having to share the raw data, and also to allow appropriate searching of the data and model.

SUMMARY

This section is meant to be exemplary and not meant to be limiting.

An exemplary method includes creating and training by a computer system machine learning models using training data from users to create corresponding trained machine learning models. The training data is in fully homomorphic encryption (FHE) domains, where each FHE domain corresponds to an individual one of the users. The method includes running by the computer system the trained machine learning models to perform inferencing using other data from at least one of the users. The running determines results. The other data is in a corresponding FHE domain of the at least one user. The method also includes determining, by the computer system and using at least the results, which of the following issues is true: the results comprise objectionable material, or at least one of the trained machine learning models performs prohibited release of information. The method also includes taking one or more actions to take to address the issue determined to be true.

A computer system comprises a memory comprising program code and one or more processors, the one or more processors, in response to retrieval and execution of the program code, causing the computer system to perform operations comprising: creating and training by a computer system machine learning models using training data from users to create corresponding trained machine learning models, the training data in fully homomorphic encryption (FHE) domains, each FHE domain corresponding to an individual one of the users; running by the computer system the trained machine learning models to perform inferencing using other data from at least one of the users, the running determining results, the other data being in a corresponding FHE domain of the at least one user; determining, by the computer system and using at least the results, which of the following issues is true: the results comprise objectionable material, or at least one of the trained machine learning models performs prohibited release of information; and taking one or more actions to take to address the issue determined to be true.

A computer program product comprising a computer readable storage medium having program instructions embodied therewith, the program instructions executable by a device to cause the device to perform operations comprising: creating and training by a computer system machine learning models using training data from users to create corresponding trained machine learning models, the training data in fully homomorphic encryption (FHE) domains, each FHE domain corresponding to an individual one of the users; running by the computer system the trained machine learning models to perform inferencing using other data from at least one of the users, the running determining results, the other data being in a corresponding FHE domain of the at least one user; determining, by the computer system and using at least the results, which of the following issues is true: the results comprise objectionable material, or at least one of the trained machine learning models performs prohibited release of information; and taking one or more actions to take to address the issue determined to be true.

DETAILED DESCRIPTION

Figure 1:
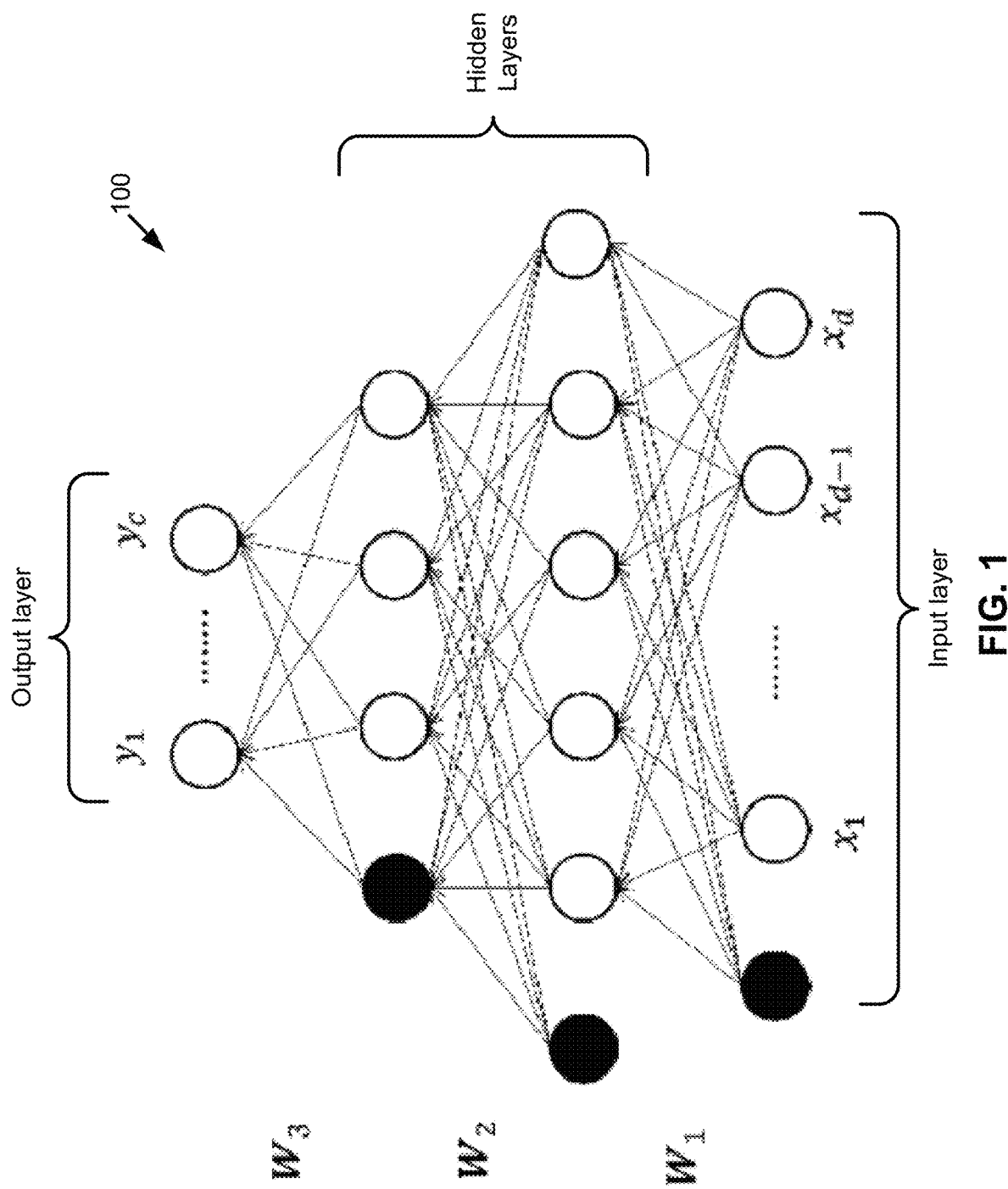
FIG. 1 illustrates an exemplary neural network with two hidden layers.

The following abbreviations that may be found in the specification and/or the drawing figures are defined as follows:

% percent
AI artificial intelligence
comb. combination
DNN deep neural network
FHE fully homomorphic encryption
HE homomorphic encryption
I/F interface
MFHE multiparty FHE
MNIST modified national institute of standards and technology
MPC multiparty computation
NIT network for inferencing and training
NN neural network
N/W network
Rx receiver
SGD stochastic gradient descent
Tx transmitter The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The primary emphasis herein is placed on techniques that address concerns such as allowing appropriate searching of data and a model (referred to as a combined AI model), in response to there being an appropriate, legitimate, and warranted reason for searching. In order to understand how such searching may be performed and utilized, however, it is beneficial to understand additional techniques upon with the primary emphasis is built.

For instance, the additional examples provided herein concern techniques for searching over encrypted model and data using secure multi-party learning based on encrypted data. These additional techniques may be used to address concerns such as where an end user has data that cannot be shared on the cloud, and by contrast a service provider cannot share its network with the user while at the same time promising good accuracy performance.

The instant examples use an underlying system referred to herein as the Fully Homomorphic Encryption based Network for Inferencing and Training (FHE-NIT). The FHE-NIT examples are not meant to be limiting. The first part of this document describes the FHE-NIT system and its technological bases. The second part of this document describes in more detail the additional exemplary embodiments that use the FHE-NIT system. These examples describe how the FHE-NIT system might be used for training of a combined AI model and subsequent use for inferencing. A further part of this document includes the techniques upon with primary emphasis herein is placed, and describes techniques that build on the previous sections and that address concerns such as allowing appropriate searching of data and a combined AI model, in response to there being an appropriate, legitimate, and warranted reason for searching.

As background, deep learning is an extremely valuable tool in solving tough problems in many core technology areas such as the following: text, speech, language, dialogue, and vision. The three factors that typically determine the success of deep learning models are the following: (i) availability of sufficient training data, (ii) access to extensive computational resources, and (iii) expertise in selecting the right model and hyperparameters for the selected task.

In many cases, the availability of data is the hard part, since data that could have been used in training cannot be shared due to compliance, legal, and/or privacy reasons. Cryptographic techniques such as fully homomorphic encryption (FHE) offer a potential solution to this conundrum. FHE allows processing of encrypted data, making the data and computations "invisible" even as they are used. While some prior work was performed on using homomorphic encryption for inferencing, training a deep neural network in the encrypted domain is an extremely challenging task due to the computational complexity of the operations involved.

In this document and for the first time, the plausibility of training is demonstrated on encrypted data. The exemplary proposed system is referred to as Fully Homomorphic Encryption based Network for Inferencing and Training (FHE-NIT), and may use, e.g., the open-source FHE toolkit HElib to implement a Stochastic Gradient Descent (SGD)-based training of a neural network. The FHI-NIT allows inferencing by querying the encrypted model. To enable encrypted training, the network should undergo significant changes to minimize the degradation in the underlying accuracy. The impact of data representation and resolution is also studied on the FHE-NIT. Finally, the efficient distribution of operations over multiple computing nodes is explored to speed up the training process.

A key advantage of FHE-NIT is that it is completely non-interactive, which prevents leakage of any sensitive information during training or inferencing. The feasibility of our end-to-end solution is demonstrated in the context of MNIST dataset and ways to reduce training time and enhance accuracy are suggested. While the cost of training a complex deep learning model from scratch may be very high, it is demonstrated that at least in some settings, this cost is not astronomical. Moreover, the exemplary proposed approaches could be used for tasks such as transfer learning as well as fine-tuning of deep learning models.

As additional introduction, deep neural networks are a powerful tool, with a wide range of applications, from speech to vision and much more. Solutions that use deep neural networks comprise two main phases, namely training and inference: After appropriate datasets are identified and curated, a network architecture is established, and then the identified corpus of data is used to train the neural network, i.e., to learn the weights for the network. Once the network weights are stable and provide meaningful results for the application at hand, the network can be used for inferencing, where the neural network renders predictions on new data. While the training time may run into days, inferencing is expected to be fast.

There are many scenarios where the data needed for training is sensitive, such as when the data belongs to some organization but cannot be shared outside that organization. For example, credit card transaction information is available with the credit card company but not for an ordinary user. Similarly, healthcare data related to patients is available in a hospital but not for a researcher to find patterns in the data for understanding cancer progression. Moreover, privacy concerns (such as the new European data privacy regulation GDPR) may restrict the availability of data. Similar situations arise where competitors would like to pull their data to build accurate models (such as different banks having data relating to the transactions and wanting to build fraud detection models). Restricting the availability of data may prevent otherwise useful models from being used, and/or degrade their performance.

Cryptographic techniques for computing on encrypted data offer an appealing approach for resolving the tension between usefulness and sensitivity of data. However, the current common wisdom is that such techniques are too slow to handle the training of common models. In this work, using Fully Homomorphic Encryption (FHE) is proposed to address this tension. The original proposal of fully-homomorphic encryption (FHE) was touted as a revolutionary technology (see Gentry, C., "Fully homomorphic encryption using ideal lattices", In Proceedings of the 41st ACM Symposium on Theory of Computing—STOC 2009, 169-178. ACM, 2009), with potential far-reaching implications to cloud computing and beyond. Though only a theoretical plausibility result at first, the last decade saw major algorithmic improvements. See, e.g., the following: (1) Brakerski, Z.; Gentry, C.; and Vaikuntanathan, V., "(leveled) fully homomorphic encryption without bootstrapping", ACM Transactions on Computation Theory 6(3):13, 2014; (2) Brakerski, Z., "Fully homomorphic encryption without modulus switching from classical gapsvp", In Safavi-Naini, R., and Canetti, R., eds., CRYPTO, volume 7417 of Lecture Notes in Computer Science, 868-886, Springer, 2012; (3) and Halevi, S., and Shoup, V, "HElib—An Implementation of homomorphic encryption", from //github.com/shaih/HElib/, the website accessed 2018 for this citation and accessed 2014 for the implementation. This has resulted in many research prototypes that implement this technology and attempt to use it in different settings. See, among others, the following: (1) Boneh, D.; Gentry, C.; Halevi, S.; Wang, F.; and Wu, D. J., "Private database queries using somewhat homomorphic encryption", in ACNS, volume 7954 of Lecture Notes in Computer Science, 102-118. Springer, 2013; (2) Gentry, C.; Halevi, S.; Jutla, C. S.; and Raykova, M., "Private database access with he-over-oram architecture", In ACNS, volume 9092 of Lecture Notes in Computer Science, 172-191, Springer, 2015; (3) Khedr, A.; Gulak, P. G.; and Vaikuntanathan, V., "SHIELD: scalable homomorphic implementation of encrypted data-classifiers" IEEE Trans. Computers 65(9):2848-2858, 2016; (4) Costache, A.; Smart, N. P.; Vivek, S.; and Waller, A., "Fixed-point arithmetic in SHE schemes", in SAC, volume 10532 of Lecture Notes in Computer Science, 401-422, Springer, 2016; (5) Gilad-Bachrach, R.; Dowlin, N.; Laine, K.; Lauter, K. E.; Naehrig, M.; and Wernsing, J., "Cryptonets: Applying neural networks to encrypted data with high throughput and accuracy" in ICML, volume 48 of JMLR Workshop and Conference Proceedings, 201-210, JMLR.org, 2016; and (6) Kim, M.; Song, Y.; Wang, S.; Xia, Y.; and Jiang, X., "Secure logistic regression based on homomorphic encryption: Design and evaluation", JMIR Med Inform 6(2):e19, 2018.

Training the model on encrypted data would enable users to provide their data to the service provider in encrypted form. The provider can then train the model without ever seeing the underlying data. The resulting model will also be encrypted, and so using the model would require access to the secret key. This makes it possible to implement flexible systems, where control of both data and model is handled via key-management, making it possible to adjust the model to business and regulatory considerations.

Perhaps surprisingly, evidence is provided herein that in some setting, it may be fast enough to support even the demanding training phase of deep neural networks, in certain situations. To the best of our knowledge, this is the first demonstration that fully homomorphic encryption can be used not just for inferencing but also for training. The design approaches presented in this document demonstrate the feasibility of FHE to protect privacy and data security while learning a network.

Regarding related work, while privacy-preserving machine learning has been studied for nearly twenty years (see Lindell, Y., and Pinkas, B., "Privacy preserving data mining, J. Cryptology 15(3):177-206, 2002; and Agrawal, R., and Srikant, R., "Privacy-preserving data mining", in Chen, W.; Naughton, J. F.; and Bernstein, P. A., eds., Proceedings of the 2000 ACM SIGMOD International Conference on Management of Data, May 16-18, 2000, Dallas, Texas, USA., 439-450), not much work was performed on specifically using homomorphic implementation for neural networks. The only prior work that was found using non-interactive homomorphic encryption for neural networks is the Crypto-Nets work of Gilad-Bachrach et al., see Gilad-Bachrach, R.; Dowlin, N.; Laine, K.; Lauter, K. E.; Naehrig, M.; and Wernsing, J., "Cryptonets: Applying neural networks to encrypted data with high throughput and accuracy", in ICML, volume 48 of *JMLR Workshop and Conference Proceedings,* 201-210, 2016. That work demonstrated a carefully-designed neural network that that can run the inference phase on encrypted data, with 99% accuracy on the MNIST optical character recognition tasks, achieving amortized rate of almost 60,000 predictions/hour.

There has been more work about using homomorphic encryption in conjunction with interactive secure-computation protocols in the context of neural networks. An early work along these lines is due to Barni et al. and Orlandi et al. (see Barni, M.; Orlandi, C.; and Piva, A., "A privacy-preserving protocol for neural-network-based computation", in Proceedings of the 8th Workshop on Multimedia and Security, MM& Sec '06, 146-151, New York, NY, USA: ACM, 2006; and Orlandi, C.; Piva, A.; and Barni, M., "Oblivious neural network computing via homomorphic encryption", EURASIP J. Information Security 2007), that combined additively-homomorphic encryption with an interactive protocol, and were able to run the inference part of a small network in about ten seconds. Many more interactive protocols for the inference phase were suggested recently, including SecureML of Mohassel and Zhang (see Mohassel, P., and Zhang, Y., "Secureml: A system for scalable privacy-preserving machine learning", in 2017 *IEEE Symposium on Security and Privacy, SP* 2017, San Jose, CA, USA, May 22-26, 2017, 19-38, IEEE Computer Society, 2017), MiniONN of Liu et al. (see Liu, J.; Juuti, M.; Lu, Y.; and Asokan, N., "Oblivious neural network predictions via minionn transformations", in Thuraisingham, B. M.; Evans, D.; Malkin, T.; and Xu, D., eds., Proceedings of the 2017 ACM SIGSAC Conference on Computer and Communications Security, CCS 2017, Dallas, TX, USA, Oct. 30-Nov. 3, 2017, 619-631, ACM, 2017), Chameleon of Riazi et al. (Riazi, M. S.; Weinert, C.; Tkachenko, O.; Songhori, E. M.; Schneider, T.; and Koushanfar, F., "Chameleon: A hybrid secure computation framework for machine learning applications", in 13 ACM Asia Conference on Information, Computer and Communications Security (ASIACCS'18), ACM, 2018), and GAZEELE of Juvekar et al. (see Vaikuntanathan, C. J. V., and Chandrakasan, A., "GAZELLE: a low latency framework for secure neural network inference", in arXiv preprint, 2018). The last of these can perform the inference phase of MNIST as fast as 30 ms, and the CIFAR-10 benchmark in just 13 seconds.

All these works address only the inference phase of using the network, and none of them addresses the training phase. In fact, no prior work could be found that concerns private training of neural networks. Presumably, this is due to the perception that trying to train homomorphically will be so slow as to render the training unusable. In the current work the first step is taken toward dispelling this perception, showing that even non-interactive homomorphic encryption can be used for training, in some cases.

Some prior work described how to preform training and inference for other types of models on encrypted data, specifically linear-regression models (see Nikolaenko, V.; Weinsberg, U.; Ioannidis, S.; Joye, M.; Boneh, D.; and Taft, N., "Privacy-preserving ridge regression on hundreds of millions of records", in Security and Privacy (SP), 2013 IEEE Symposium on, 334-348. IEEE, 2013) and even logistic-regression models, see the following: (1) Wang, S.; Zhang, Y.; Dai, W.; Lauter, K.; Kim, M.; Tang, Y.; Xiong, H.; and Jiang, X., "Healer: homomorphic computation of exact logistic regression for secure rare disease variants analysis in gwas", Bioinformatics 32(2):211-218, 2016; (2) Gu, Z. G. T., and Garg, S., "Safetynets: Verifiable execution of deep neural networks on an untrusted cloud", in Advances in Neural Information Processing Systems, NIPS '13, 2017; (3) Kim, M.; Song, Y.; Wang, S.; Xia, Y.; and Jiang, X., "Secure logistic regression based on homomorphic encryption: Design and evaluation", *JMIR Med Inform* 6(2):e19, 2018; (4) Kim, A.; Song, Y.; Kim, M.; Lee, K.; and Cheon, J. H., "Logistic regression model training based on the approximate homomorphic encryption", Cryptology ePrint Archive, Report 2018/254, 2018; and (5) Crawford, J. L. H.; Gentry, C.; Halevi, S.; Platt, D.; and Shoup, V., "Doing real work with FHE: the case of logistic regression", *IACR Cryptology ePrint Archive* 2018:202, 2018.

This section quickly reviews the basic operation needed in a neural network implementation and see how these have been implemented in an FHE context. In a typical neural network, there are multiply, add and non-linearity applied to the sum. The HELib provides us with an optimal implementation of the basic functions like add and multiply. The non-linearity may be implemented in our case as, e.g., a look-up table.

The first work that was found addressing how to effectively implement arithmetic needed for HE computations is by Cheon et al. (see Cheon, J. H.; Kim, M.; and Kim, M., "Search-and-compute on encrypted data", in International Conference on Financial Cryptography and Data Security, 142-159, Springer, 2015), where they describe several optimizations for binary comparison and addition, in a setting where one can spread the bits of each integer among multiple plaintext slots of a ciphertext. Other relevant works on homomorphic binary arithmetic are due to Xu et al. (see Costache, A.; Smart, N. P.; Vivek, S.; and Waller, A., "Fixed-point arithmetic in SHE schemes", in SAC, volume 10532 of Lecture Notes in Computer Science, 401-422, Springer, 2016) and Chen et al. (see Chen, J.; Feng, Y.; Liu, Y.; and Wu, W., "Faster binary arithmetic operations on encrypted integers", in WCSE'17, Proceedings of 2017 the 7th International Workshop on Computer Science and Engineering, 2017), who worked in the same bitslice model as us and used similar techniques for this part. But they only provided partially optimized solutions, requiring deeper circuits and more multiplications than are used herein. For example, they only used a size-4 carry-lookahead-adder for addition, and did not use the three-for-two procedure for multiplication.)

In this part of this document, the deep learning model and the components of possible solutions are described that are needed to achieve full homomorphic encryption for learning and inference. In this document, the primarily focus is on supervised deep learning, where the broad objective is to learn a non-linear mapping between the inputs (e.g., training samples) and the outputs (e.g., class labels of the training samples). Deep learning models are typically implemented as multi-layer neural networks, which allows higher-level abstract features to be computed as non-linear functions of lower-level features (starting with the raw data). FIG. 1 shows an exemplary neural network (NN) with two hidden layers. The NN 100 is a deep neural network (DNN), which is typically defined as a NN with multiple hidden layers. The input layer is $x_1, \ldots, x_{d-1}, x_d$ the output layer has nodes $y_1, \ldots, y_c$, there are two hidden layers shown, and weights (e.g., as matrices) $W_1, W_2$, and $W_3$ are shown. The output of each node in the network (where a node is also known as a neuron) is computed by applying a non-linear activation function to the weighted average of its inputs, which includes a bias term (shown darkened) that always emits value 1. The output vector of neurons in layer $\ell$ ($\ell=1, 2, \ldots, L$) is obtained as the following:

$$a_\ell = f(W_\ell a_{\ell-1}), \quad (1)$$

where $f$ is the activation function, $W_\ell$ is the weight matrix of layer $\ell$, and L is the total number of layers in the network.

Given the training data $\{x_i, y_i\}_{i=1}^N$, the goal is to learn the parameters (e.g., weight matrices) in order to minimize a pre-defined loss function $\mathcal{L}$. This is a non-linear optimization problem, which is typically solved using variants of gradient descent (see LeCun, Y.; Bottou, L.; Bengio, Y.; and Haffner, P., "Gradient-based learning applied to document recognition", in Proceedings of the IEEE 86(11):2278-2324, 1998). Gradient descent starts with a random set of parameters, computes the gradient of the loss function $\mathcal{L}$ at each step, and updates the parameters so as to decrease the gradient. In this work, the well-known stochastic gradient descent (SGD) algorithm (see Zinkevich, M.; Weimer, M.; Li, L.; and Smola, A. J., "Parallelized stochastic gradient descent", in NIPS'10, Proceedings of the 23rd International Conference on Neural Information Processing Systems—Volume 2, Pages 2595-2603, 2010) is used, where the gradients are averaged over a small (e.g., randomly sampled without replacement) subset (e.g., mini-batch) of the whole training dataset. One full iteration over the entire training set is referred to as the epoch. The above gradient update step is repeated until convergence to a local optimum or until the maximum number of epochs is reached. The update rule for SGD for weight matrix $W_\ell$ is the following:

$$W_\ell := W_\ell - \alpha \frac{\partial \mathcal{L}_B}{\partial W_\ell}, \quad (2)$$

where $\mathcal{L}$ is the loss function computed over the mini-batch B and $\alpha$ is the learning rate. The error or loss value at the output layer is computed based on the forward pass, while backpropagation is used to propagate this error back through the network.

Concerning homomorphic implementation of deep learning, the open-source fully homomorphic encryption library called HElib (see Halevi, S., and Shoup, V, "HElib—An Implementation of homomorphic encryption", from //github.com/shaih/HElib/, the website accessed 2018 for this citation and accessed 2014 for the implementation) is used as a primary toolkit to implement the model learning procedure. Devising a homomorphic computation of this procedure brings up many challenges. Here, some of them are briefly discussed.

Regarding implementing the basic homomorphic operation, most of the operations in model learning are linear, such as involving additions and multiplications. The current version of HElib that is used supports addition and multiplication operations of arbitrary numbers in a binary representation, using encryption of the individual bits. This means that the underlying homomorphic encryption scheme is used with native plaintext space modulo 2. This is used to encrypt the bits of the input.

Two key steps in the algorithm require computing "complex" functions (such as exponentiation, and the like). These two steps are (i) computation of the activation function $f$ and its derivative, and (ii) computation of the loss function $\mathcal{L}$ and its derivative. The "natural" approaches for computing these functions homomorphically, are either to approximate them by low-degree polynomials (e.g., using their Taylor expansion), or by pre-computing them in a table and performing homomorphic table lookup. Namely, for a function $f$ that is needed to be computed, it is possible to pre-compute (in the clear) a table $T_f$ such that $T_f[x]=f(x)$ for every X in some range. Subsequently, given the encryptions of the (bits of) x, homomorphic table lookup is performed to get the (bits of) value $T_f[x]$. Following Crawford et al. (see Crawford, J. L. H.; Gentry, C.; Halevi, S.; Platt, D.; and Shoup, V., "Doing real work with FHE: the case of logistic regression", IACR Cryptology ePrint Archive 2018:202, 2018), the second approach is adopted here. This is faster and shallower when it is applicable, but it can only be used to get a low-precision approximation of these functions. In order to avoid the use of too many table lookups, a sigmoid activation function and a quadratic loss function are used, which have simpler derivatives.

Next, parameters and bootstrapping are discussed. The parameter setting was adopted that was used in Crawford, et al., "Doing real work with FHE: the case of logistic regression", which means that the "production version" of an exemplary solution uses the cyclotomic ring $\mathbb{Z}[X]/(\Phi_m(X))$, with $m=2^{15}-1$, corresponding to lattices of dimension $\phi(m)=27000$. This native plaintext space yields 1800 plaintext slots, each holding a bit. Each slot can actually hold an element of $GF(2^{15})$, but the slots are used to hold bits in an exemplary implementation. The other parameters are chosen so as to achieve a security level of about 80 bits, and this parameter setting allows bootstrapping, so one can evaluate the deep circuits that are required for training.

Most of our development and testing was performed on a toy setting of parameters, with $m=2^{10}-1$ (corresponding to lattices of dimension $\phi(m)=600$). For that setting, there are only 60 plaintext slots per ciphertext (each capable of holding an element of $GF(2^{10})$, but only used in an exemplary embodiment to hold a single bit).

For data representation and encoding, all the operations in the proposed solution are applied to integers in binary representation. That is, using encryption of the individual bits.

As for input and output, in an exemplary embodiment, an 8-bit signed integer representation is used for the inputs to the network. The outputs of the network are the weight matrices and each element in the weight matrix may be represented as a 16-bit signed integer. To address negative integers, the 2s-complement representation is used wherever necessary.

For ciphertext packing, in an exemplary embodiment, the mini-batch size is set during training to be the same as the number of slots in the plaintext space. Note that for an exemplary final implementation, $m=2^{15}-1$, and the number of slots is 1800. The ciphertexts are represented as 2-dimensional arrays, i.e., encryptedInput[i][0] contains the encryption of the least significant bits of all the 1800 numbers in the i-th dimension of the input. Similarly, encryptedInput[i][7] contains the encryptions of the most significant bits.

Regarding matrix multiplication, one of the most important and time-consuming operations in the encrypted domain, especially in the context of mini-batch SGD, is matrix multiplication. Since computation of dot products is not straightforward, due to the way in which the inputs are packed in a ciphertext, the following simple approach is adopted for matrix multiplication in the encrypted domain. Suppose $A=[a_{ij}]$ and $B=[b_{jk}]$ are two matrices, where $i=1, \ldots, d_i, j=1, \ldots, d_j$ and $k=1, \ldots, d_k$. Let $C=[c_{ik}]$ be the product of A and B. Then, $$c_{i \cdot} = \sum_{j=1}^{d_j} \alpha_{ij} b_{j \cdot}, \quad (3)$$

where $C_i$ is a ciphertext packing all the elements in the $i^{th}$ row of c, $\alpha_{ij}$ is a ciphertext containing the encryption of value $a_{ij}$ in all the slots, and $b_{j\cdot}$ is a ciphertext packing all the elements in the $j^{th}$ row of B. Thus, each matrix multiplication involves $d_i \times d_j$ ciphertext multiplications. Note that the subscript "i" after the variables c and b have a dot ("•") after the subscript.

At this point, the dataset used in our experiment is described. Additionally, the results are described in terms of accuracy and timing.

Figures 2, 2A, 2B, 3:
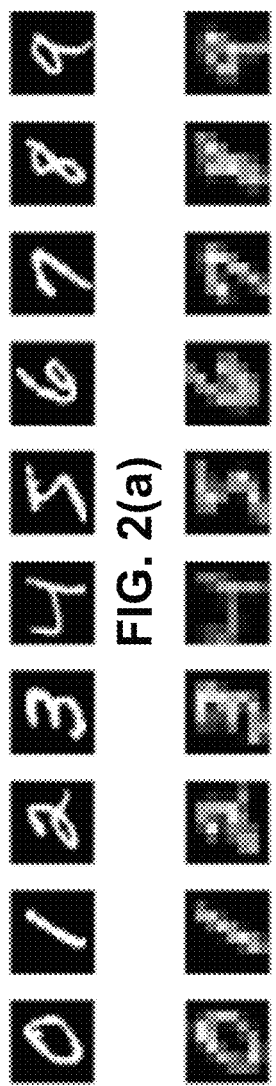
FIG. 2 illustrates samples from the MNIST training dataset as follows.
FIG. 2(a) illustrates a (28×28) pixel representation before any preprocessing.
FIG. 2(b) illustrates an (8×8) pixel representation after cropping and rescaling.
FIG. 3 illustrates a 3-layer fully connected network with a sigmoid activation function.

As for dataset and neural network parameter selection, experiments were conducted on the standard MNIST benchmark dataset (see LeCun, Y.; Bottou, L.; Bengio, Y.; and Haffner, P., "Gradient-based learning applied to document recognition", in Proceedings of the IEEE 86(11):2278-2324, 1998) for handwritten digit recognition consisting of 60,000 training examples and 10,000 test examples. Each example is a 28×28 gray-level image, with digits located at the center of the image. See FIG. 2, which illustrates samples from the MNIST training dataset as follows: FIG. 2(a) illustrates (28×28) pixel representation before any preprocessing; and FIG. 2(b) illustrates (8×8) pixel representation after cropping and rescaling (displayed with a similar size as the top row for comparison). The architecture of the neural network used in this part of the disclosure is shown in FIG. 3, which is a 3-layer fully connected network with sigmoid activation function. More specifically, FIG. 3 illustrates a neural network architecture (NN2) used for MNIST dataset with 64 inputs. FIG. 3 is a representation (e.g., in pseudo-code) of a 4-layer DNN, with (1) as the input layer, (2)+(3) as a first hidden layer, (4)+(5) as a second hidden layer, and (6)+(7) as the output layer. This is one possible version of what is shown in FIG. 1. There are 64 input nodes in the input layer and 10 output nodes in the output layer.

Cropping of boundary pixels and rescaling using bicubic interpolation are used to reduce the original MNIST images to (8×8) pixels. The cropping and rescaling operations are performed in the plaintext domain and the 64 inputs are then encrypted using the FHE scheme. All the samples (i.e., both training and test) were normalized by subtracting the average, and then dividing by the standard deviation of training samples. This normalized image is finally vectorized to obtain a $d_0$-dimensional representation. This forms the input to the neural network, i.e., $x_i \in \mathcal{R}^{d_0}$.

Since the objective is to classify the input as one of 10 possible digits within ["0"-"9"], the size of the output layer is set as 10. Consequently, the desired output is represented as a 10-dimensional vector, $y_i = [y_{i,0}, \ldots, y_{i,9}]$, with value $y_{ij}=1$ if the sample belongs to $j^{th}$ class and 0 otherwise. A quadratic loss function is used at the output during training, i.e., $\mathcal{L}=(\|a_L-y_i\|^2)/2$. During inferencing, the input sample is assigned to the class whose corresponding neuron (e.g., an output node) has the highest activation.

Two different sets of parameters are considered for the above 3-layer neural network. Firstly, The full 784-dimensional (28×28) input is presented to the neural network (denoted as NN1), which contained 128 and 32 neurons in the two hidden layers. Consequently, the number of parameters to be learned is 104,938 (calculated as =(128×785)+ (32×129)+(10×33)). Since learning such a large number of parameters is currently beyond the reach of most FHE schemes, a much smaller network (denoted as NN2) is also considered with $d_0=64$, and containing 32 and 16 neurons in the two hidden layers (see FIG. 3). This is achieved by cropping only the central 24×24 pixels of each image and rescaling the image by a factor of (⅓) using bicubic interpolation to obtain a 8×8 pixel representation. FIG. 2 shows some examples of the raw and processed MNIST images. For the latter network, the number of parameters to be learned is only 2,778, computed by the following: =(32× 65)+(16×33)+(10×17).

The weights of the network may be randomly initialized by sampling from a Gaussian distribution with zero mean and a standard deviation of 0.1. Though quadratic loss function and sigmoid activation function may not be optimal choices for the selected application, these are nevertheless employed in an exemplary embodiment to avoid a need for complex table lookups during backpropagation. Note that the sigmoid activation function is given by $f(z)=(1+\exp(-z))^{-1}$ and its derivative can be easily computed as $f'(z)=f(z)(1-f(z))$, without the need for any rational divisions. Similarly, the derivative of the quadratic loss function is simply $(a_L-y_i)$. Thus, the entire training process requires the computation of only one complex function, namely, the sigmoid function, which is implemented as an 8-bit table lookup as described above.

Figures 4, 5:
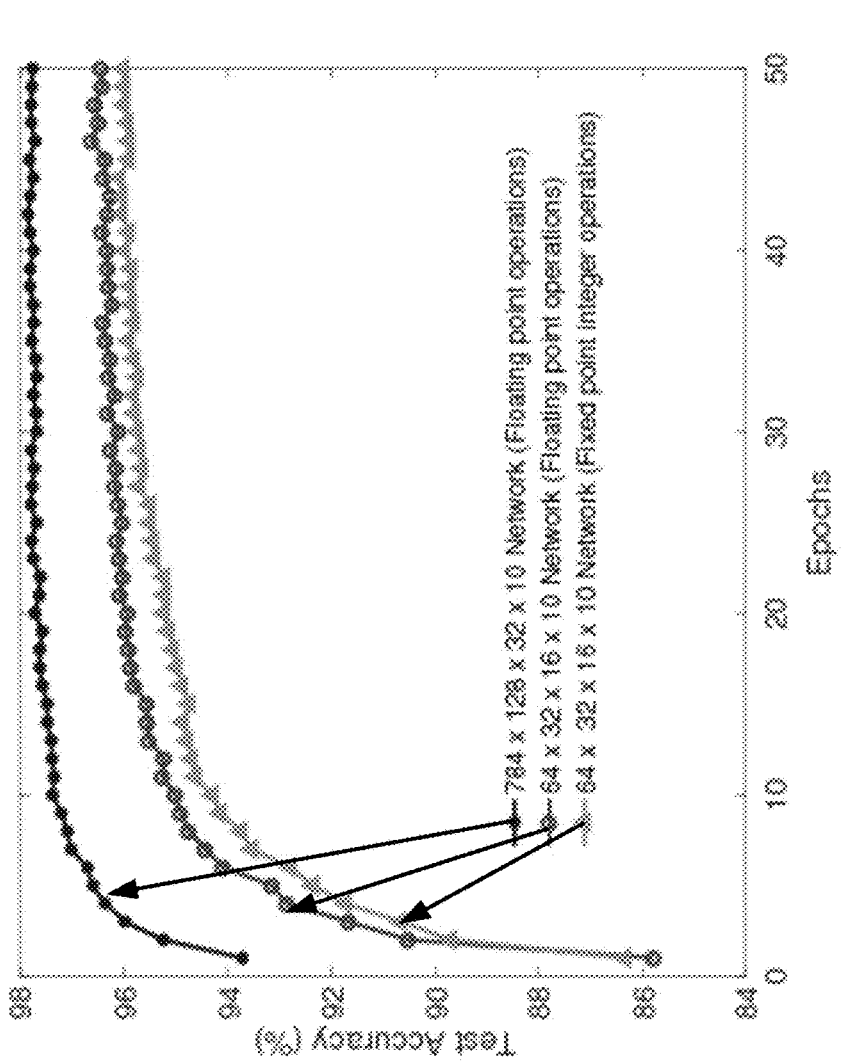
FIG. 4 is a graph illustrating classification accuracy of proposed neural networks on the MNIST (modified national institute of standards and technology) test dataset.
FIG. 5 is a table (Table 1) illustrating the time taken (in seconds) to process one neuron at a first layer of a neural network.

Concerning classification accuracy, both the networks (NN1 and NN2) described in the previous section are trained using mini-batch SGD with a batch size of 60 samples. When these networks are trained for 50 epochs using full floating point operations, they achieve an overall classification accuracy of 97.8% (for NN1) and 96.4% (for NN2). The evolution of test accuracy over multiple epochs is shown in FIG. 4. FIG. 4 is a graph illustrating classification accuracy of proposed neural networks on the MNIST (modified national institute of standards and technology) test dataset. This shows that reasonable classification accuracy can be achieved on the MNIST dataset with a much fewer number of parameters.

Next, to estimate the classification accuracy of the proposed FHE-NIT solution, all the values are quantized into fixed-point signed integers. As described earlier, 8-bit representations are used for all the input and loss values, while 16-bit representations are used for the weights and gradients. It can be observed from FIG. 4 that the above quantized network (trained in the plaintext domain) can achieve a classification accuracy of 96%. Finally, in an exemplary embodiment, the gradient computations are verified in the encrypted domain for a single mini-batch of data. Using the exact same weight initializations and sample set in both the plaintext and encrypted domains, it has been confirmed that the computations performed in both the domains are identical. Thus, it can be claimed for this example that the classification accuracy of the model learned using homomorphically encrypted data will be the same as that of the quantized version of NN2, which is 96%.

As for computational complexity, testing of encrypted domain processing was performed on an Intel Xeon ES-2698 v3 (which is a Haswell processor), with two sockets and sixteen cores per socket, running at 2.30 GHz. The machine has 250 GB of main memory. The compiler was GCC version 7.2.1. NTL version 10.5.0 and GnuMP version 6.0 were used.

The following cyclotomic ring was primarily used: $\mathbb{Z}[X]/\Phi_m(X)$, with $m=2^{10}-1=1023$ (so $\phi(m)=600$). This ring was used for most of the development tasks. Since these parameters do not provide sufficient security, an attempt was made to compare the time complexity when $m=2^{15}-1=32767$ (so $\phi(m)=27000$), which corresponds to about 80 bits of security.

With respect to single-threaded timing, for m=1023, a single thread execution of one mini-batch of size 60 training samples, required approximately 9 hours and 24 minutes. Almost 80% of this time is consumed by the three matrix multiplication tasks. These were the following: computation of the weight average input to a layer (requires multiplication of the input to a layer with its corresponding weight matrix); loss propagation to the previous layer (requires multiplication of the loss at the previous layer with the weight matrix); and the gradient computation. One complete mini-batch requires 6 bootstrapping operations (one after each layer during both the forward pass and backpropagation).

It was also observed that when m=32767, almost all the operations slowed down by approximately 40-60 times on a single threaded machine. However, it must be noted that m=32767 can accommodate 1,800 slots as compared to 60 slots for m=1023. Therefore, it is possible to compensate for the increased computational complexity, e.g., by packing more input samples into a single ciphertext and reducing the number of batches to be processed.

With respect to multi-threaded timing, multi-threading was very effective in reducing the computation time because it is well-known that the weight updates in SGD are independent. In other words, it is possible to process each neuron independently and in parallel. Even within a single neuron, the multiplication operations across multiple input dimensions can be parallelized. From Table 1, illustrated in FIG. 5, it can be observed that by parallelizing computations within a single neuron across multiple threads, it is possible to achieve almost linear speedup. FIG. 5 is a table (Table 1) illustrating the time taken (in seconds) to process one neuron at a first layer of a neural network. Specifically, with 30 threads, about a 15× (fifteen times) speed-up was observed, which means that the execution of one mini-batch would take well under an hour for m=1023.

Now that the FHE-NIT system has been described, information corresponding to the current exemplary embodiments is described. In particular, techniques for secure multi-party learning and inferring insights based on encrypted data are described.

Regarding training, the techniques presented in this section use the FHE-NIT system to perform secure multi-party learning and inferring insights based on encrypted data.

Figure 6A:
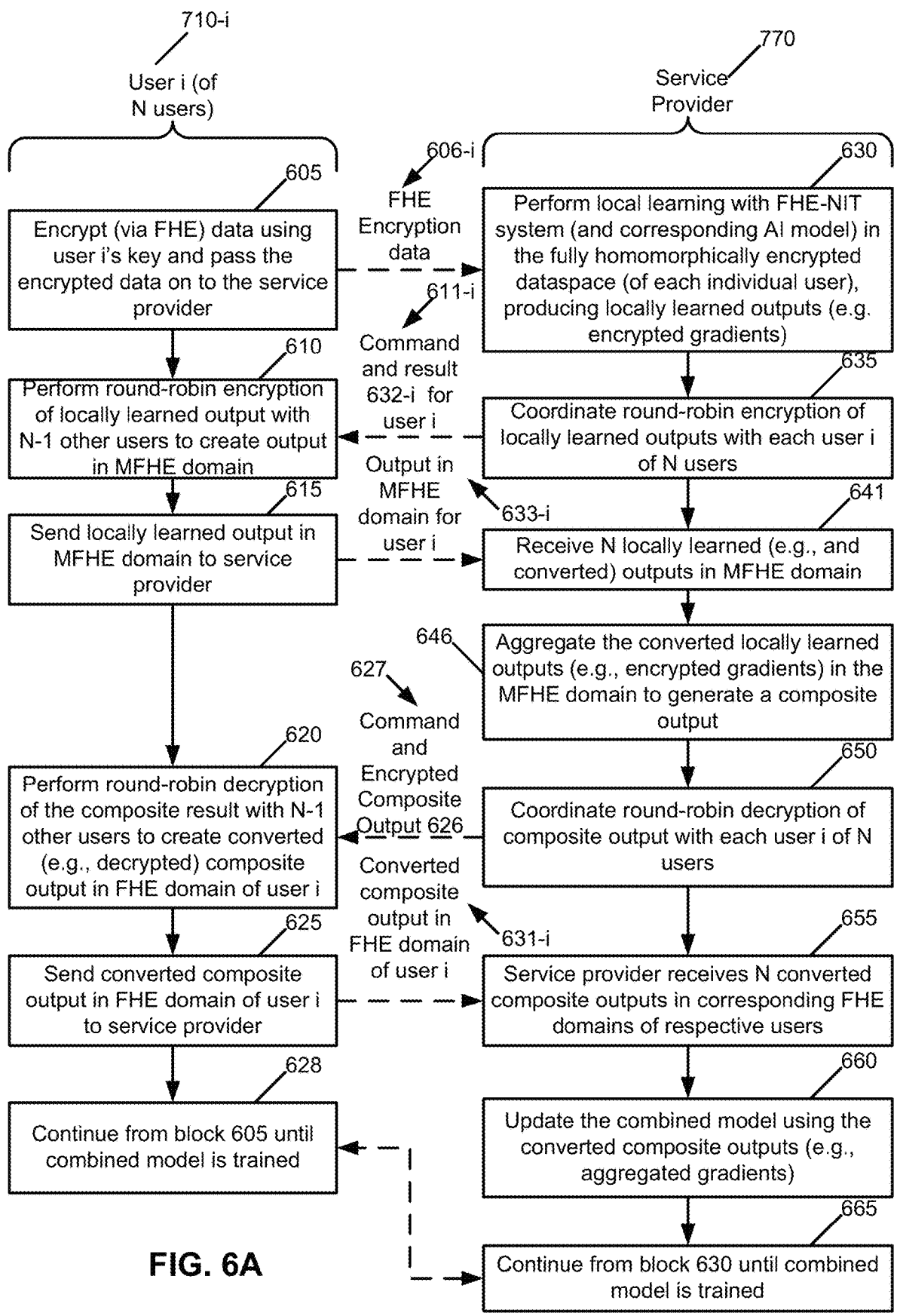
FIG. 6A is a flowchart of an exemplary method for secure multi-party learning from encrypted data, between a user i and a service provider, in accordance with an exemplary embodiment.
Figure 6B:
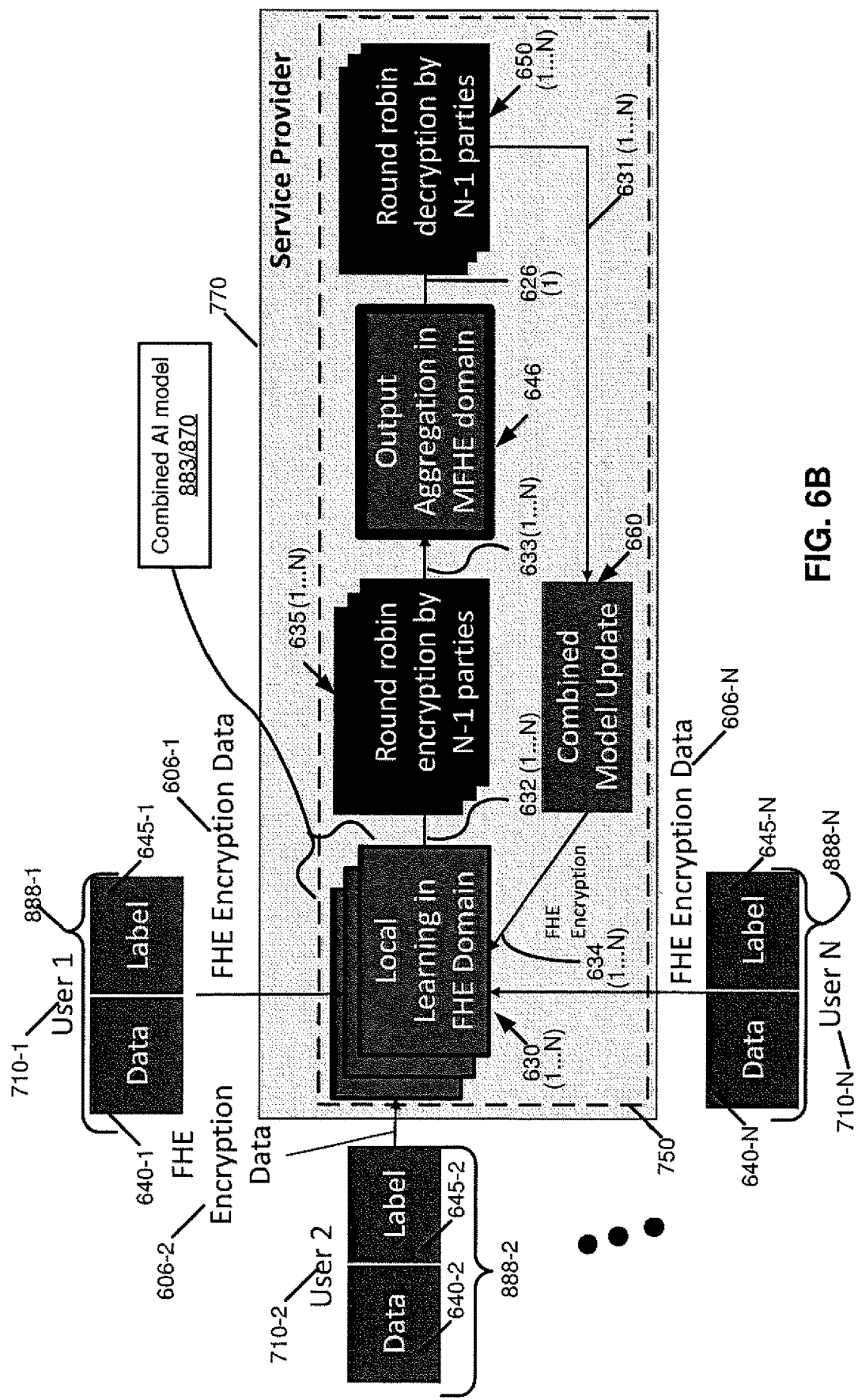
FIG. 6B is an exemplary system diagram from the perspective of a service provider for the flow in FIG. 6A.

Referring to FIG. 6A, this figure is a flowchart of an exemplary method for secure multi-party learning from encrypted data, in accordance with an exemplary embodiment. On the left side are actions taken by one user (user i 710-*i*) of N (where N is two or more) users 710. It is noted that a "user 710" in this instance comprises a computer system (such as a client computer system). On the right side are actions taken by a service provider 770, which is also a computer system (such as a server). Reference may also be made to FIG. 6B, which is an exemplary system diagram from the perspective of the service provider 770 for the flow in FIG. 6A. As described in reference to FIG. 8, the user computer 710 performs the actions in FIGS. 6A and 6B under control of a security module 740. The actions for the service provider 770 in FIGS. 6A and 6B are defined by a homomorphic learning and inferencing module 750 (see FIG. 8), which may be implemented in hardware or software or some combination of these. See FIG. 8 for additional description of the security module 740 and the homomorphic learning and inferencing module 750.

Each user 710 encrypts a data/label pair 888 (comprising training data 640 and a corresponding label 645) by their own key (shown as key k 880 in FIG. 8) and passes the encrypted data 606 on to the service provider 770. This is illustrated in FIG. 6A by block 605, where user i 710-*i* encrypts (via FHE) data/label pair 888 (see FIG. 6B) using user i's key and passes the encrypted data 606-*i* on to the service provider 770. In FIG. 6B, there are N users 710-1, 710-2, through 710-N, and each of these has a corresponding data/label pair 888-1, 888-2, through 888-N(comprising corresponding training data 640-1, 640-2, through 640-N and a corresponding label 645-1, 645-2, through 645-N). The training data 640 is data the user 710 is using to train the combined (comb.) AI model 883. The result of the training will be the trained combined AI model 870. The label 645 is an indicator of what the training data 640 is. For instance, if the training data is an image of a cat, the label could be "cat". Note that training typically requires many data/label pairs 888. It is noted that the content of the data 640 and corresponding label 645 is different for each user 710, but the form of data 640 and label 645 should be identical, e.g., so the service provider 770 can determine what the information is.

Local learning happens at the service provider 770 in the fully homomorphically encrypted dataspace (of an individual user). In FIG. 6A, this is illustrated by block 630, where the service provider 770 performs local learning with the FHE-NIT system (and corresponding combined AI model 883) in the fully homomorphically encrypted dataspace (of each individual user), producing locally learned outputs (e.g., encrypted gradients). The locally learned outputs may be gradients, which as is known are used in a gradient descent algorithm, using back propagation, to adjust the weight of neurons by calculating the gradient of the loss function. Other information is possible as the locally learned outputs, as gradient descent is only one of multiple different algorithms to determine to adjust the weights. In FIG. 6B, this is illustrated by the block 630 of "Local Learning in FHE domain". There is a "(1 . . . N)" associated with the block 630 to indicate that block 630 is performed N times, each block corresponding to a respective single user 1 710-1, user 2 710-2, through user N 710-N. Conceptually, one can think of an intermediate local learned model (e.g., 630) per user, which is what FIG. 6B appears to illustrate. However, the exemplary embodiments herein actually do not compute a consumable model per user, and instead compute a single combined AI model 883 (where reference 870 indicates a trained version of the combined AI model 883). For instance, in an exemplary embodiment, this is a single model with one set of weights that is trained using data from multiple users. The calculations are performed using a fully homomorphically encrypted dataspace of each individual user (where there are N users in the examples of FIGS. 6A and 6B), which means that calculations for a single user 710 are performed in their own dataspace, distinguished, e.g., at least by a different key for this user from other users.

At this point, the N locally learned outputs 632 (e.g., encrypted gradients) are in the fully homomorphically encrypted dataspace of each individual user and need to be converted into a multiparty FHE (MFHE) domain so that additional learning may be performed for the multiple parties of the N users 710. In order to convert the fully homomorphically encrypted dataspace of each individual user into data for the MFHE domain, the service provider 770 in block 635 of FIG. 6A coordinates round-robin encryption of the result of locally learned outputs 632 to each user i of N users 710. The coordination occurs using, in an exemplary embodiment, a command message 611-*i* for the user 710-*i* and includes a corresponding locally learned output 632-*i*. This is illustrated in FIG. 6B where the (1 . . . N) locally learned outputs 632 are sent via (1 . . . N) blocks 635 to each corresponding user 710. Note that each user receives a corresponding locally learned output 632-*i* that has been determined using the FHE dataspace of this individual user.

As indicated in block 610, each user 710-*i* performs round-robin encryption of its locally learned output 632-*i* with N−1 other users to create an output in the MFHE domain, and in block 615 sends the locally learned output 633 in the MFHE domain to the service provider 770. That is, each of the N−1 other users performs a single corresponding encryption on a result passed to this user from another one of the users, and this continues until all N−1 users have performed encryption. For block 635 of FIG. 6A (or 6B), each user 710-$i$ of the N users receives a request 610-$i$ and a corresponding locally learned output 632-$i$, which is already encrypted in the fully homomorphically encrypted dataspace of the individual user 710-$i$. The user 710-1 sends the locally learned output 632-$i$ to the N−1 other users for their encryption. For instance, assume there are three users 710-1, 710-2, and 710-3. The user 710-1 sends its locally learned output 632-1 to users 710-2 and 710-3 for their encryption, and whichever user is the last user to perform encryption sends the resultant locally learned output 633-1 in MFHE domain to the service provider 770 or to the user 710-1, which then sends the final result to the service provider 770. Similarly, the user 710-2 sends its locally learned output 632-2 to users 710-1 and 710-3 for their encryption, and whichever user is the last user to perform encryption sends the resultant locally learned output 633-2 in MFHE domain to the service provider 770 or to the user 710-2, which then sends the final result to the service provider 770. Finally, the user 710-3 sends its locally learned output 632-3 to users 710-1 and 710-2 for their encryption, and whichever user is the last user to perform encryption sends the resultant locally learned output 633-3 in MFHE domain to the service provider 770 or to the user 710-3, which then sends the final result to the service provider 770.

It is noted that block 615 assumes that the user 710-$i$ controls the round-robin process to have all N−1 other users 710 encrypt its locally learned output 632-$i$ and consequently receives and sends the (e.g., final) resultant locally learned output 633-$i$ in the MFHE domain to the service provider 770. Other options are possible, such as the user 710-$i$ starting the round-robin process and sending its locally learned output 632-$i$ to a next user 710, which encrypts the output 632-1 and sends the encrypted result to another user, and so on until a final user 710 sends the completely encrypted and resultant locally learned output 633-$i$ in the MFHE domain to the service provider 770. This is another option that has been described above also. The service provider 770 could also control each round-robin encryption for each of the locally learned outputs 632-$i$, such that the service provider 770 would send and receive all results 632-$i$ and 633-$i$.

In block 641 of FIG. 6A, the service provider 770 receives (1-N) locally learned (e.g., and converted) outputs 633 in the MFHE domain. The (1-N) associated with reference 633 in FIG. 6B indicates there are N of these.

Locally learned outputs 633 (e.g., encrypted gradients) in the MFHE domain are aggregated by the service provider 770 to generate an encrypted composite output 626, which is encrypted by the keys of all the parties. This is illustrated in FIG. 6A by block 646 as the service provider 770 aggregating the converted locally learned outputs 633 (e.g., encrypted gradients) in the MFHE domain to generate a composite output 626, which is encrypted by the keys of all the parties. Aggregating in this instance means the information learned from each output is combined to derive a better learned combined AI model 883 (see FIG. 6B) from the combination of the individual data outputs. For instance, aggregation can be any function that statistically represents all the locally learned outputs 633. Aggregation could be an average, aggregation could be a median, or aggregation could be any other suitable function. If the locally learned outputs 633 are gradients, aggregation could be an average of the gradients, a median of the gradients, or any other suitable function. FIG. 6B illustrates in block 646 this output aggregation in the multiparty MFHE domain, and the (1) associated with the encrypted composite output 626 illustrates that the encrypted composite output 626 is a single output.

Note that calculations in the MFHE domain may be performed as described in Adriana Lopez-Alt, et al., "On-the-Fly Multiparty Computation on the Cloud via Multikey Fully Homomorphic Encryption", STOC '12 Proceedings of the forty-fourth annual ACM symposium on Theory of computing, pages 1219-1234, 2012. This reference describes, e.g., techniques for performing multikey (e.g., multiparty) FHE with ciphertexts from multiple corresponding clients and performing a desired circuit on the ciphertexts.

Now that an additional amount of learning has been performed in the MFHE domain via block 646, the encrypted composite output 626 needs to be converted from the MFHE domain into the fully homomorphically encrypted dataspace of the individual users 710. To enable this, the service provider 770 coordinates round-robin decryption of the composite output 626 with each user $i$ of N users 710. In block 650 of FIG. 6A, this is illustrated for user $i$ 710-1, and the service provider 770 sends the encrypted composite 626 and a corresponding command message 627 (in this example) to user $i$ 710-1 (and also to the other N−1 users 710) to perform coordination of the round-robin decryption. The user $i$ 710-$i$ in block 620 performs round-robin decryption of the composite output 626 with N−1 other users to create a converted (e.g., decrypted) composite output 631-$i$ in the FHE domain of user $i$. That is, each of the N−1 other users performs a single corresponding decryption on a output passed to this user from another one of the users, and this continues until all N−1 users have performed decryption. The user $i$ 710-$i$ in block 625 sends a converted composite output 631-$i$ in the FHE domain of user $i$ to the service provider 770. Note that the converted composite output 631-1 is decrypted from the perspective of the other N−1 users 710 but is encrypted in the FHE domain of user 710-$i$. In block 655, the service provider 770 receives N converted composite outputs 631 in corresponding FHE domains of respective users. In FIG. 6B, this is illustrated by the (1 . . . N) blocks 650 of round-robin decryption, each block performed by N−1 parties under control, e.g., of one of the parties. The service provider 770 receives and uses the corresponding (1 . . . N) converted composite outputs 631 in the corresponding FHE domains of respective users.

As described above with respect to block 615, it is noted that block 650 assumes that the user 710-$i$ controls the round-robin process to have all N−1 other users 710 perform round-robin decryption of the encrypted composite output 626 to create the decrypted result 631-$i$ in the FHE domain of user $i$. Consequently, the user $i$ 710-$i$ sends the resultant decrypted result 631-$i$ to the service provider 770. Other options are possible, such as the user 710-$i$ starting the round-robin process and sending its received composite output 626 to a next user 710, which decrypts the composite output 626 and sends the partially decrypted composite output 631-$i$ to another user, and so on until a final one of the N−1 other users 710 sends the decrypted composite output 631-$i$ in the FHE domain of user $i$ to the service provider 770. The service provider 770 could also control each round-robin decryption, such that the service provider 770 would send and receive all partially decrypted composite outputs and also the decrypted composite output 631-$i$ in the FHE domain of user $i$.

The combined AI model 883 is updated in block 660 of FIG. 6A and by block 660 in FIG. 6B. The service provider 770 in block 660 updates the combined model 883 using the (1 . . . N) decrypted composite outputs 631 (e.g., aggregated gradients).

This is an iterative process typically, so that training can be performed initially over a time period, and may also be performed at other times, such as if another user 710 joins. Therefore, in block 628, the user i 710-1 continues from block 605 until the combined model 883 is trained (e.g., and becomes a trained combined model 870). In block 665, the service provider 770 continues from block 630 until the combined model 883 is trained. Note that there may be some coordination between the user i 710-i and the service provider 770 to determine when the combined model 883 is considered to be trained and the process can stop, and the dashed line between blocks 628 and 665 is indicative of this coordination.

Figure 7A:
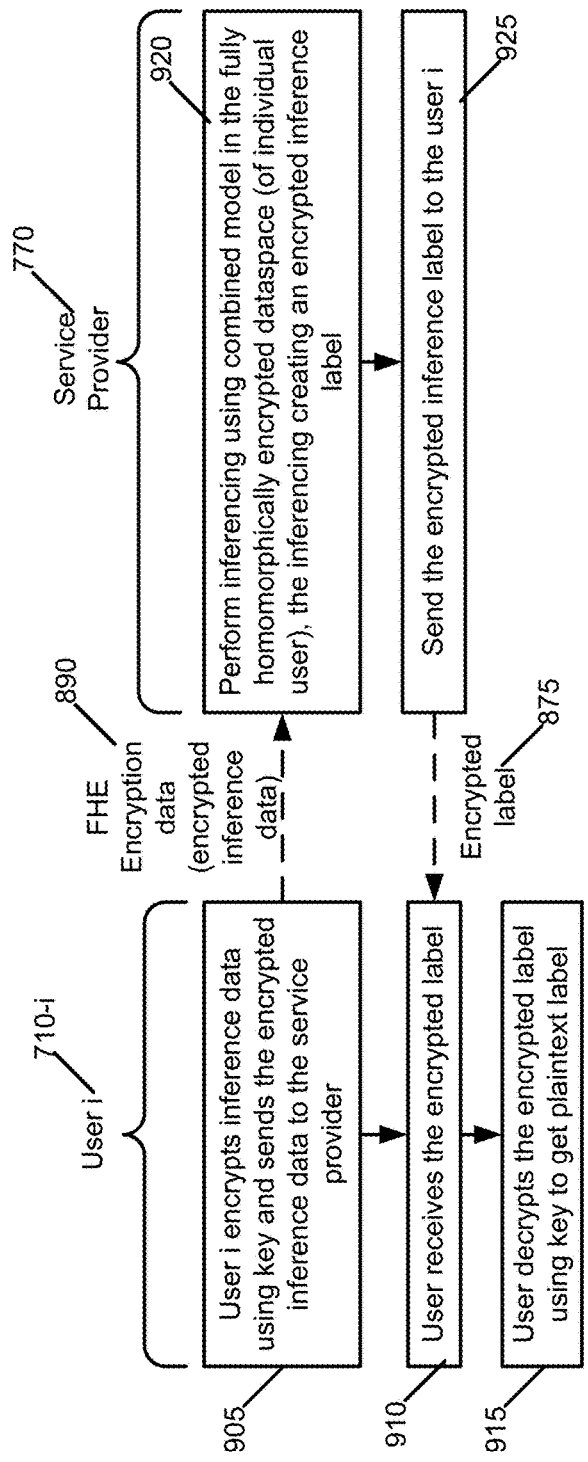
FIG. 7A is a flowchart of an exemplary method for inferring insights based on encrypted data, in accordance with an exemplary embodiment.
Figure 7B:
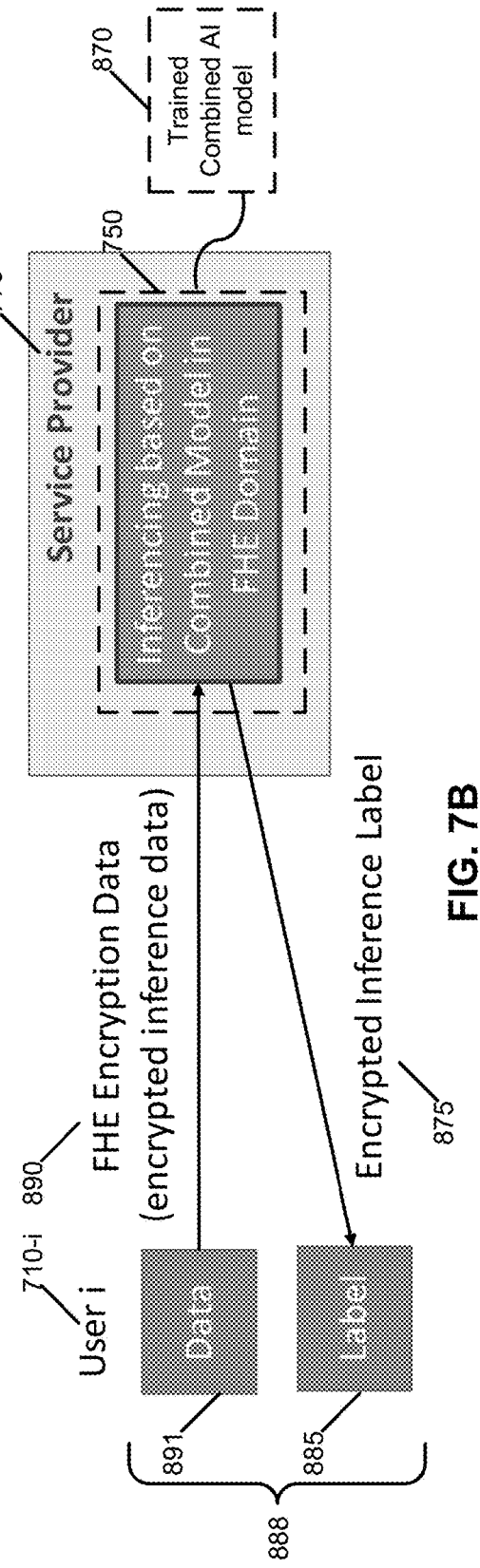
FIG. 7B is an exemplary system diagram for the flow in FIG. 7A.

Referring to FIG. 7A, a flowchart is shown of an exemplary method for inferring insights based on encrypted data, in accordance with an exemplary embodiment. FIG. 7B is an exemplary system diagram for the flow in FIG. 7A.

Inferencing happens at the service provider 770 based on the combined model in the fully homomorphically encrypted dataspace (of an individual user). The user will receive encryption of the label predicted by the trained combined AI model 870. The encrypted label can be decrypted by him/her.

On the left side are actions taken by one user (user i 710-i) of multiple users (not shown in FIG. 7A but shown in FIG. 7B). It is noted that a "user 710" in this instance comprises a computer system (such as a client computer system). On the right side are actions taken by a service provider 770, which is also a computer system (such as a server). Reference may also be made to FIG. 7B, which is an exemplary system diagram for the flow in FIG. 7A.

In block 905 of FIG. 7A, the user I 710-i encrypts inference data 891 using the user's key and sends the encrypted inference data 890 to the service provider 770. In FIG. 7B, this is illustrated by the user i 710-i encrypting inference data 891 and sending the FHE encryption data of encrypted inference data 890 to the service provider 770.

The service provider in block 920 of FIG. 7A performs inferencing using the trained combined AI model 810 in the fully homomorphically encrypted dataspace (of the individual user). The inferencing is performed by the homomorphic learning and inferencing module, comprising the trained combined AI model 870. The inferencing creates an encrypted inference label 875. In block 925, the service provider 920 sends the encrypted inference label 875 to the user i 710-i. This is illustrated by the service provider 770 sending the encrypted inference label 875 to the user i 710-i in FIG. 7B.

The user i 710-i receives the encrypted inference label 875 in block 910 of FIG. 7A and the user decrypts the encrypted inference label 875 in block 915 to get a plaintext (e.g., decrypted) label 885. This is illustrated in FIG. 7B by the user i 710-i creating the plaintext label 885 form the received encrypted inference label 875. Note that the user i 710-i may not need to decrypt the encrypted inference label 875 and instead could use the encrypted inference label 875 in its current FHE domain of the user.

Figure 8:
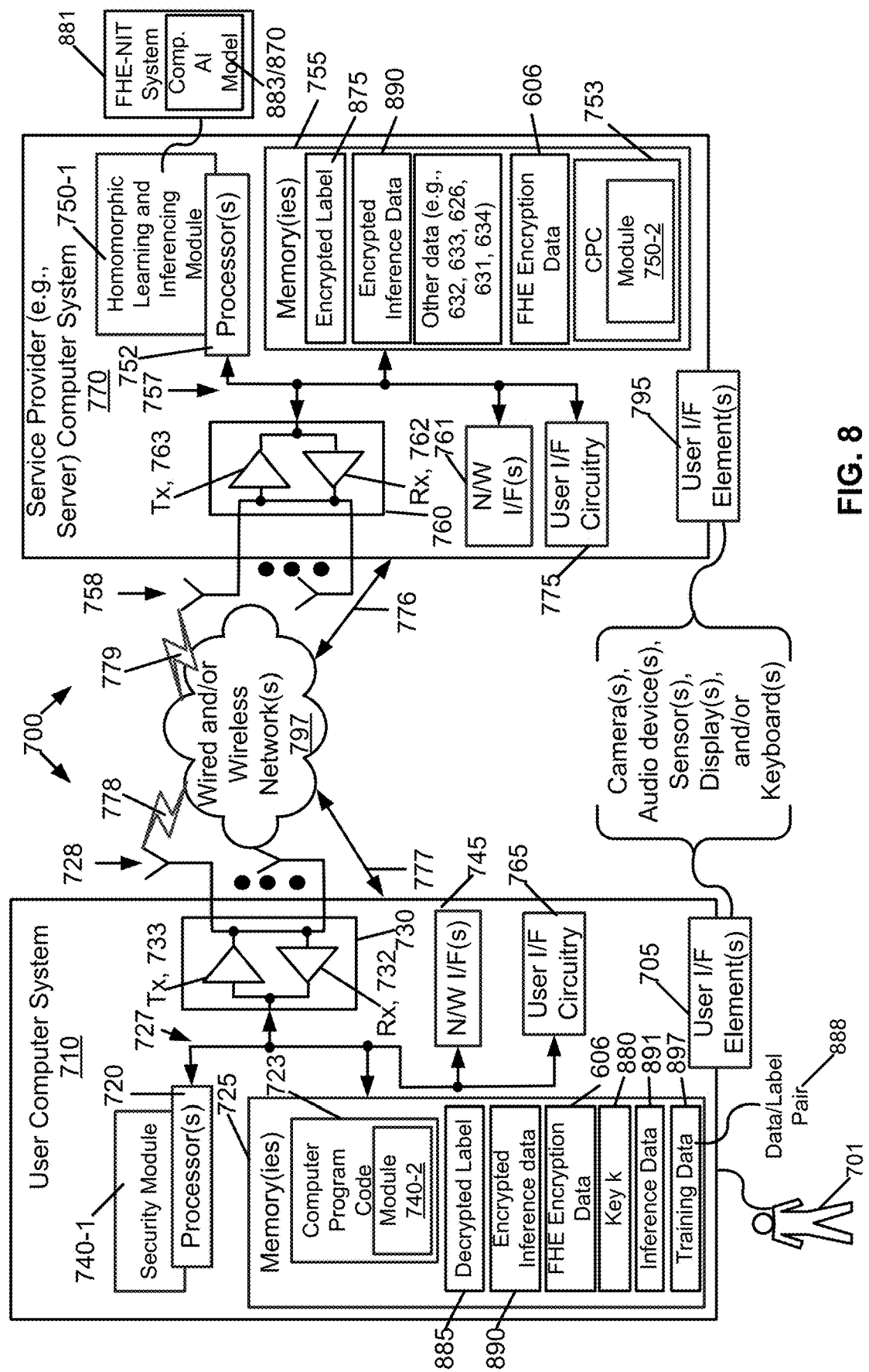
FIG. 8 is a block diagram of an exemplary and non-limiting system in which the exemplary embodiments may be implemented, in accordance with an exemplary embodiment.

Turning to FIG. 8, this figure shows a block diagram of one possible and non-limiting exemplary system 700 in which the exemplary embodiments may be practiced. In FIG. 8, a user computer system 710 is in wired and/or wireless communication with a provider computer system 770. It is assumed the user computer system 710 is a client that accesses the service provider computer system 770, e.g., as a server. However, there does not need to be a client/server relationship between the user computer system 710 and the provider computer system 770.

The user computer system 710 includes one or more processors 720, one or more memories 725, one or more transceivers 730, one or more network (N/W) interfaces (I/F(s)) 745, and user interface circuitry 765, interconnected through one or more buses 727. Each of the one or more transceivers 730 includes a receiver, Rx, 732 and a transmitter, Tx, 733. The one or more buses 727 may be address, data, and/or control buses, and may include any interconnection mechanism, such as a series of lines on a motherboard or integrated circuit, fiber optics or other optical communication equipment, and the like. The one or more transceivers 730 are connected to one or more antennas 728. The one or more memories 725 include computer program code 723, training data 897, inference data 891, a key k 880, FHE encryption data 606, encrypted inference data 890, and a decrypted label 885. The training data 897 may include multiple data/label pairs 888. For instance, as described above, the data might be an image and the label might be "cat", to indicate the image is of a cat.

The user computer system 110 includes a security module 740, comprising one of or both parts 740-1 and/or 740-2. The security module 740 performs the operations described above that are performed by the user, e.g., in FIGS. 6A and 7A. The security module 740 may be implemented in a number of ways. The security module 740 may be implemented in hardware as security module 740-1, such as being implemented as part of the one or more processors 720. The security module 740-1 may be implemented also as an integrated circuit or through other hardware such as a programmable gate array. In another example, the security module 740 may be implemented as security module 740-2, which is implemented as computer program code 723 and is executed by the one or more processors 720. For instance, the one or more memories 725 and the computer program code 723 may be configured to, with the one or more processors 720, cause the user computer system 710 to perform one or more of the operations as described herein. It should also be noted that the devices shown in the user computer system 710 are not limiting and other, different, or fewer devices may be used.

The user interface circuitry 765 communicates with one or more user interface elements 705, which may be formed integral with the user computer system 710 or be outside the user computer system 710 but coupled to the user computer system 710. The user interface elements 705 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used. A user 701 (a human being in this example) interacts with the user computer system 710, e.g., to cause the system 710 to take certain actions such as causing the system 710 to perform secure multi-party learning and inferring insights based on encrypted data. These operations may also be caused by the user computer system 710, in combination with actions by the user 701 or without actions by the user 701. The user computer system 710 communicates with service provider computer system 770 via one or more wired or wireless networks 797, via wired links 777 and 778 and wireless links 778 and 779.

The service provider computer system 770 includes one or more processors 752, one or more memories 755, one or more network interfaces (N/W I/F(s)) 761, one or more transceivers 760, and user interface circuitry 775, interconnected through one or more buses 757. Each of the one or more transceivers 760 includes a receiver, Rx, 762 and a transmitter, Tx, 763. The one or more transceivers 760 are connected to one or more antennas 758. The one or more memories 755 include computer program code 753, FHE encryption data 606, encrypted inference data 890, and an encrypted label 875.

The service provider computer system 770 includes a homomorphic learning and inferencing module 750. The homomorphic learning and inferencing module 750 includes an FHE-NIT system 881, as described above, which includes an AI model 883 and a trained version 870 of the AI model 883. The AI model 883 may be a neural network (NN) such as a deep neural network (DNN), which is typically defined as a NN with multiple hidden layers. The homomorphic learning and inferencing module 770 comprises one of or both parts 750-1 and/or 750-2, which may be implemented in a number of ways.

The homomorphic learning and inferencing module 750 may be implemented in hardware as homomorphic learning and inferencing module 750-1, such as being implemented as part of the one or more processors 752. The homomorphic learning and inferencing module 750-1 may be implemented also as an integrated circuit or through other hardware such as a programmable gate array. In another example, the homomorphic learning and inferencing module 750 may be implemented as homomorphic learning and inferencing module 750-2, which is implemented as computer program code 753 and is executed by the one or more processors 752. For instance, the one or more memories 755 and the computer program code 753 are configured to, with the one or more processors 752, cause the service provider computer system 770 to perform one or more of the operations as described herein. It should also be noted that the devices shown in the service provider computer system 770 are not limiting and other, different, or fewer devices may be used.

The one or more buses 757 may be address, data, and/or control buses, and may include any interconnection mechanism, such as a series of lines on a motherboard or integrated circuit, fiber optics or other optical communication equipment, wireless channels, and the like. The user interface circuitry 775 communicates with one or more user interface elements 795, which may be formed integral with the service provider computer system 770 or be outside the server computer system 770 but coupled to the service provider computer system 770. The user interface elements 795 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used. For instance, the server could be remotely operated and there might not be any user interface element 795.

This section describes techniques that build on the previous sections and that address concerns such as allowing appropriate searching of data and a combined AI model, in response to there being an appropriate, legitimate, and warranted reason for searching. This section uses some of the figures described above, but modified for the specific techniques addressed here.

As previously stated, when appropriate, legitimate, and warranted, authorized personnel should be able to search the data and model for the multi-party system described above.

The service provider 770 in particular is used for these techniques, although as described above, the service provider 770 has to communicate with users 710.

As also stated above, many groups within the same agency have data but they are not allowed to share it among themselves, and many competitors have similar data but not enough for each one of them to benefit from machine learning (e.g., banks, governments). The previously-described embodiments addressed these concerns.

Possible concerns addressed in this section include the following. The encrypted data and model service enables use of these services for illegitimate analytics trafficking, either in collusion with the provider or unbeknownst to the provider. That is, because everything is encrypted, the service provider may be (e.g., unknowingly) harboring data that is illegal, e.g., in the state or country in which the service provider is location or with which the service provider has a legal requirement. Furthermore, the service provider may be explicitly or unknowingly providing a model that releases information that should not be released under the law. Therefore, when warranted, the authorities should be able to search both the encrypted model and the data used in that model, e.g., such as for training the model.

As an overview of how these concerns are addressed, both the encrypted data and locally learned outputs (or commitments to them) may be published in an immutable log (e.g., blockchain). A commitment to the combined model is also published in the immutable log. When warranted, the authorities can perform some secure computations in the composite encrypted dataspace, and may also, e.g., force the parties to decrypt the results in order to verify whether the model or data contains any prohibited characteristics.

Figure 9A:
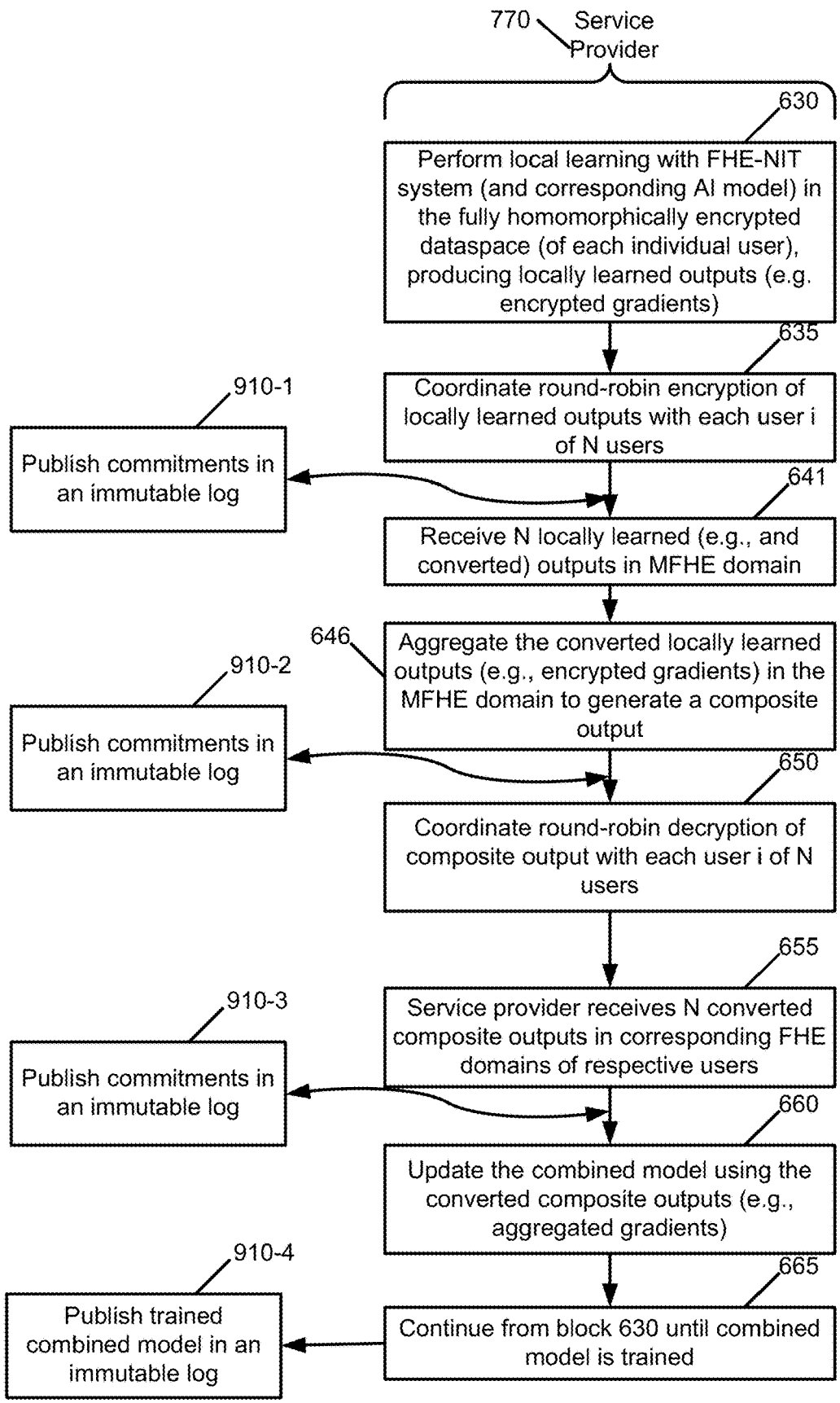
FIG. 9A is a flowchart of an exemplary method for searching over encrypted model and data using secure multi-party learning based on encrypted data, illustrates operations between a user i and a service provider, in accordance with an exemplary embodiment, and has elements corresponding to part of FIG. 6A.
Figure 9B:
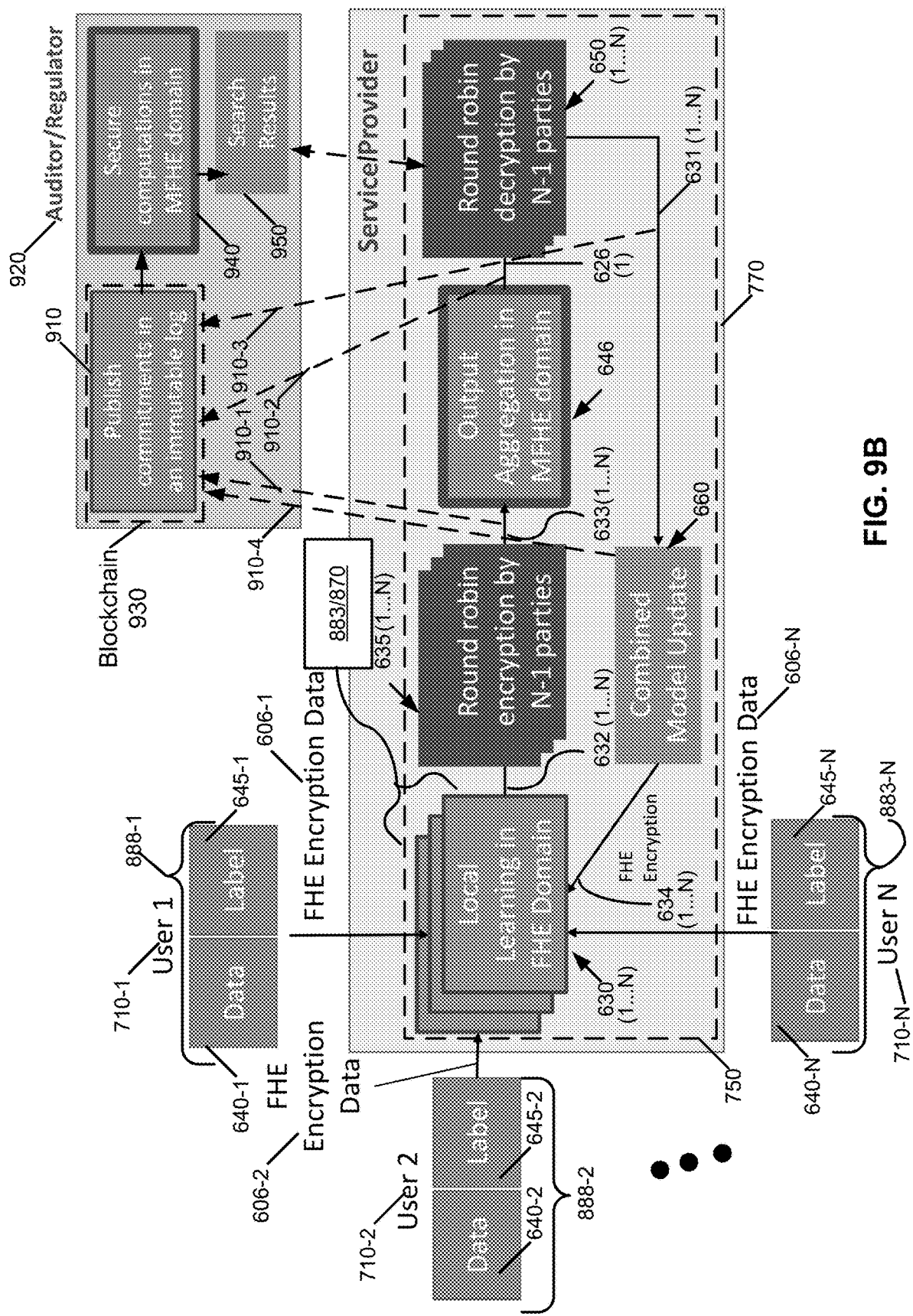
FIG. 9B is an exemplary system diagram from the perspective of a service provider and auditor/regulator for the flow in FIG. 9A, and has elements of corresponding to FIG. 6B.

Turning to FIGS. 9A and 9B, FIG. 9A is a flowchart of an exemplary method for searching over encrypted model and data using secure multi-party learning based on encrypted data, and illustrates operations between a user i and a service provider, in accordance with an exemplary embodiment. This figure has elements corresponding to part of FIG. 6A. In particular, the operations performed by service provider 770 are shown. The operations performed by the user i 710-1 have been removed to allow for additional operations to be shown. Additionally, the dashed lines and corresponding communications between the service provider 770 and user i 710-i have been removed, for clarity. FIG. 9B is an exemplary system diagram from the perspective of a service provider for the flow in FIG. 9A, and has many elements corresponding to FIG. 6B.

At certain exemplary locations in the flow of FIG. 9A, commitments are published by the service provider 770, and are published in block 930 in a database such as a blockchain 930 in FIG. 9B. As is known, a commit is an updating of a record in a database. In the flow of FIG. 9A, this occurs in the following blocks: block 910-1, which is performed after coordination of round-robin encryption of locally learned outputs with each user i of N users in block 635; block 910-2, which is performed after block 646, in which the service provider 770 aggregates the converted locally learned outputs (e.g., encrypted gradients) in the MFHE domain to generate a composite output; block 910-3, which is performed after block 655, in which the service provider 770 receives N converted composite outputs in corresponding FHE domains of respective users; and block 910-4, in which the service provider 770 commits the trained combined model 870 to the blockchain 930. A general version of block 910 is also shown in FIG. 9B, and the individual commitments 910-1, 910-2, 910-3 and 910-4 are also shown. These commitments 910-1, 910-2, 910-3 and 910-4 are also illustrated in FIG. 9B, by dashed lines. The immutable log is illustrated as blockchain 930 in FIG. 9B, although other types of immutable logs may be use. Note that immutable logs may also be referred to as immutable data stores or immutable databases or immutable audit logs. In these storage scenarios, the data that gets stored does not change and is not overwritten. Instead, additional information is written to the log as time passes.

It is assumed that an auditor/regulator 920 has control of the blockchain 930. In block 940, the auditor/regulator performs secure computations in the MFHE domain. This may include determining search results in block 950, which would have to have a round-robin decryption in b1 650 by N−1 parties, as previously described. This is also described in more detail below.

For ease of understanding, it is helpful to review what is being performed so that it is easier to see what is being stored in blocks 910. Turning FIG. 10, this figure is a flowchart of an exemplary method of a basic protocol for multiparty computation (MPC). This flowchart is adapted from Adriana Lopez-Alt, et al., "On-the-Fly Multiparty Computation on the Cloud via Multikey Fully Homomorphic Encryption", STOC '12 Proceedings of the forty-fourth annual ACM symposium on Theory of computing, pages 1219-1234, 2012. In particular, see section 4, "On-the-Fly MPC from Multikey FHE" in the Adriana Lopez-Alt paper. First, the blocks in FIG. 10 will be described in relation to the general protocol for the Adriana Lopez-Alt paper, and then the blocks will be described again in relation to FIGS. 9A and 9B and other figures herein.

The basic protocol in the Adriana Lopez-Alt paper lets $\{\varepsilon^{(N)}=(\text{Keygen,End,Dec,EVal})\}_{N\geq 0}$ be a multi-key fully homomorphic family of encryption schemes. In block 1010, each party samples a key tuple, encrypts an input, and sends a resultant cyphertext for evaluation to a server (e.g., the service provider 770). In mathematical terms, for $i \in \lfloor U \rfloor$, party $P_i$ samples a key tuple $(pk_i, sk_i, ek_i) \leftarrow \text{Keygen}(1^K)$ and encrypts its input $x_i$ under $pk_i$: $c_i \leftarrow \text{Enc}(pk_i, x_i)$. The pk is a private key, the sk is a secret key, and the ek is an evaluation key. The evaluation key may be thought of as providing (encrypted) information such as "there is a cat in the picture". The party sends $(pk_i, ek_i, c_i)$ to the server S. The cyphertext $c_i$ is to be evaluated based in part on the information in the evaluation key.

In block 1020, the server computes an evaluation of a circuit using ciphertexts and broadcasts a resultant composite model to parties. After block 1010, a function F, represented as a circuit C, has been selected on inputs $\{x_i\}_{i \in V}$ for some $V \subseteq U$, where $N=|V|$ and it is assumed that $V=|N|$. The server S computes c:=Eval $(C,(c_1, pk_1, ek_1), \ldots, (c_N, pk_N, ek_N))$ and broadcasts c to parties $P_1, \ldots, P_N$.

In block 1030, the parties run a secure MPC protocol to compute a function on the circuit to determine an evaluated cyphertext. That is, the parties $P_1, \ldots, P_N$ run a secure MPC protocol to compute the function $g_c(sk_1, \ldots, sk_N) \doteq \text{Dec}(sk_1, \ldots, sk_n, c)$, which returns an encrypted (answer) cyphertext for a party in the FHE domain of that party. In the example where the input $x_i$ is a cat in a picture, the result could then be an encrypted version of "there is a cat in the picture". The individual users can then decrypt this result to find the cleartext answer of "there is a cat in the picture".

Figure 10:
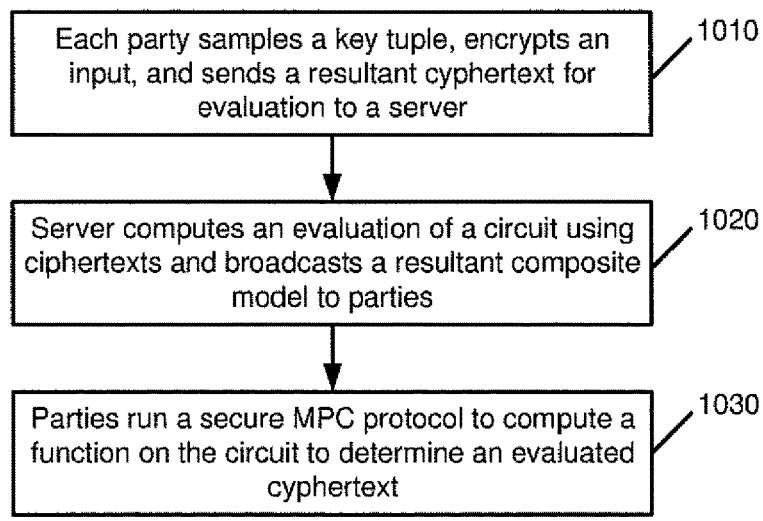
FIG. 10 is a flowchart of an exemplary method of a basic protocol for multiparty computation (MPC)

In terms of FIGS. 9A and 9B, block 1010 of FIG. 10 corresponds at least to blocks 630 and 635. The locally learned outputs 633 (of which there are N) are akin to the cyphertexts $c_i$, and each of these corresponds evaluation keys $ek_i$ (e.g., in the locally learned outputs 632). The commitment of this data in block 910-1 therefore provides access to the locally learned outputs 633. In terms of block 1020, this corresponds at least to block 646 and its corresponding output, the encrypted composite output 626, which corresponds to the composite model c. The commitment of this data in block 910-2 provides access to the encrypted composite output 626 and therefore the composite model c. Block 1030 corresponds at least to block 650, and the corresponding composite outputs 631 (of which there are N). The service provider 770 now has results in the individual FHE domains of the user, and these results are akin to the encrypted (answer) cyphertext. The commitment of this data in block 910-3 provides access to the composite outputs 631.

Figure 11A:
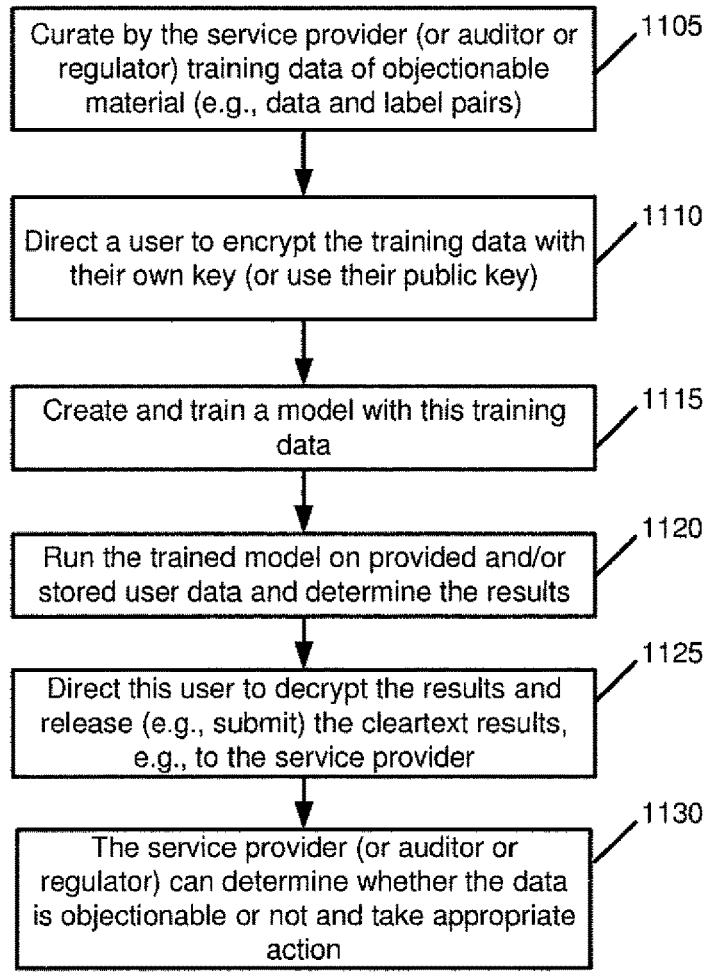
FIG. 11A is a flowchart of an exemplary method for searching over encrypted data using secure single-party learning to determine whether objectionable material is being used by a single user.
Figure 11B:
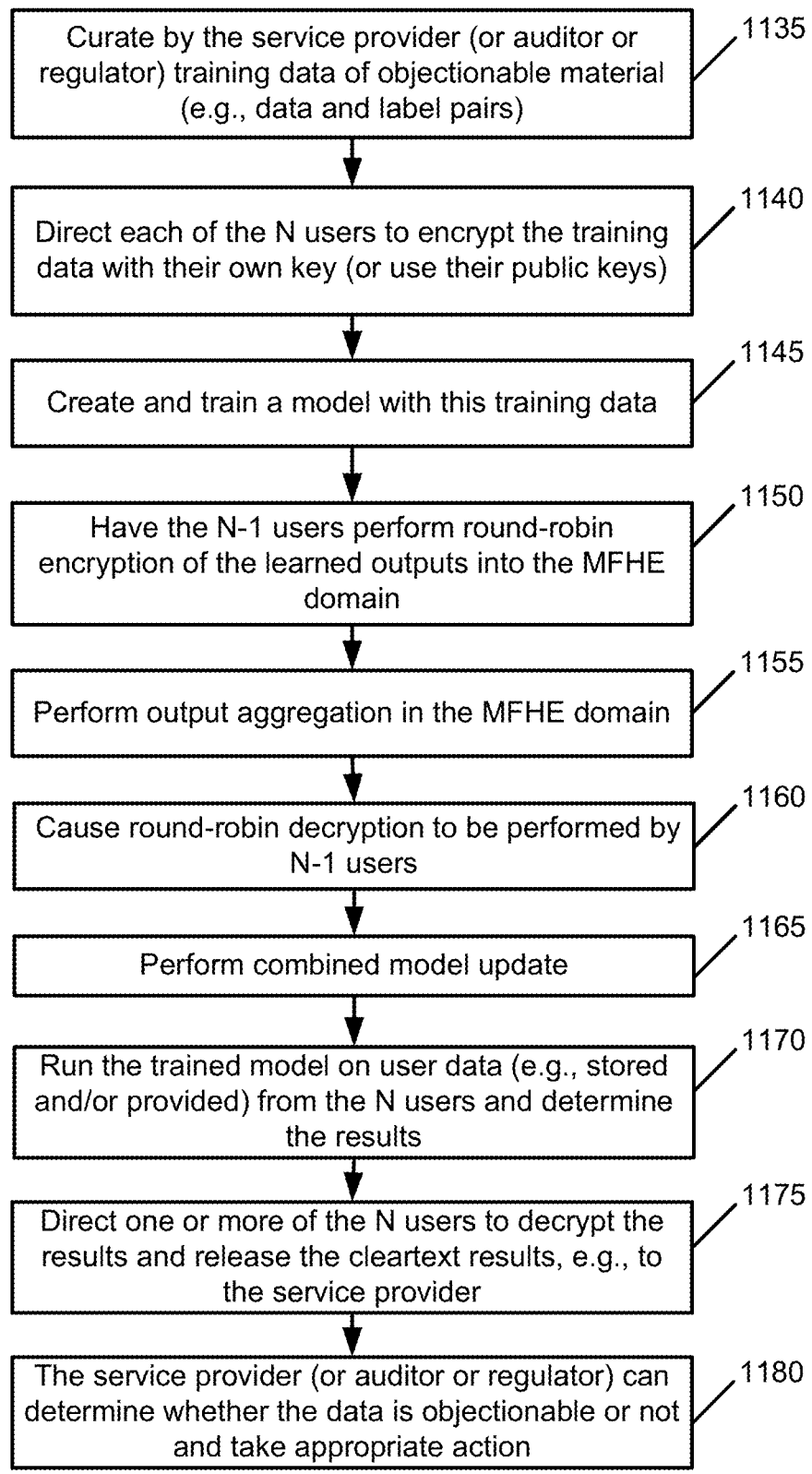
FIG. 11B is a flowchart of an exemplary method for searching over encrypted data using secure multi-party learning to determine whether objectionable material is being used by one or more of N users.

There are a number of ways this information may be used. Two primary uses are described herein. One use concerns data. As previously described, service provider might not be allowed to store certain data, such as under the law of the locale where the data is stored or where the storage provider is located or incorporated or for other legal reasons. FIG. 11A describes one scenario where a service provider uses secure single-party learning to determine whether objectionable material is being used by a single user. FIG. 11B describes another scenario, where a service provider uses secure multi-party learning to determine whether objectionable material is being used by one or more of N users. Note that the service provider may also be requested to or potentially made to perform these methods by an auditor or regulator as auditor/regulator 920. That is, the data analysis may rely on MFHE, as in FIG. 11B, and used, e.g., when the investigation is a routine check of all users' data. However, the analysis could be FHE, e.g., when the service provider wants to investigate only one user, say because of a specific complaint/tip. The service provider 770 may not want to let the other users know about the investigation.

Figure 12:
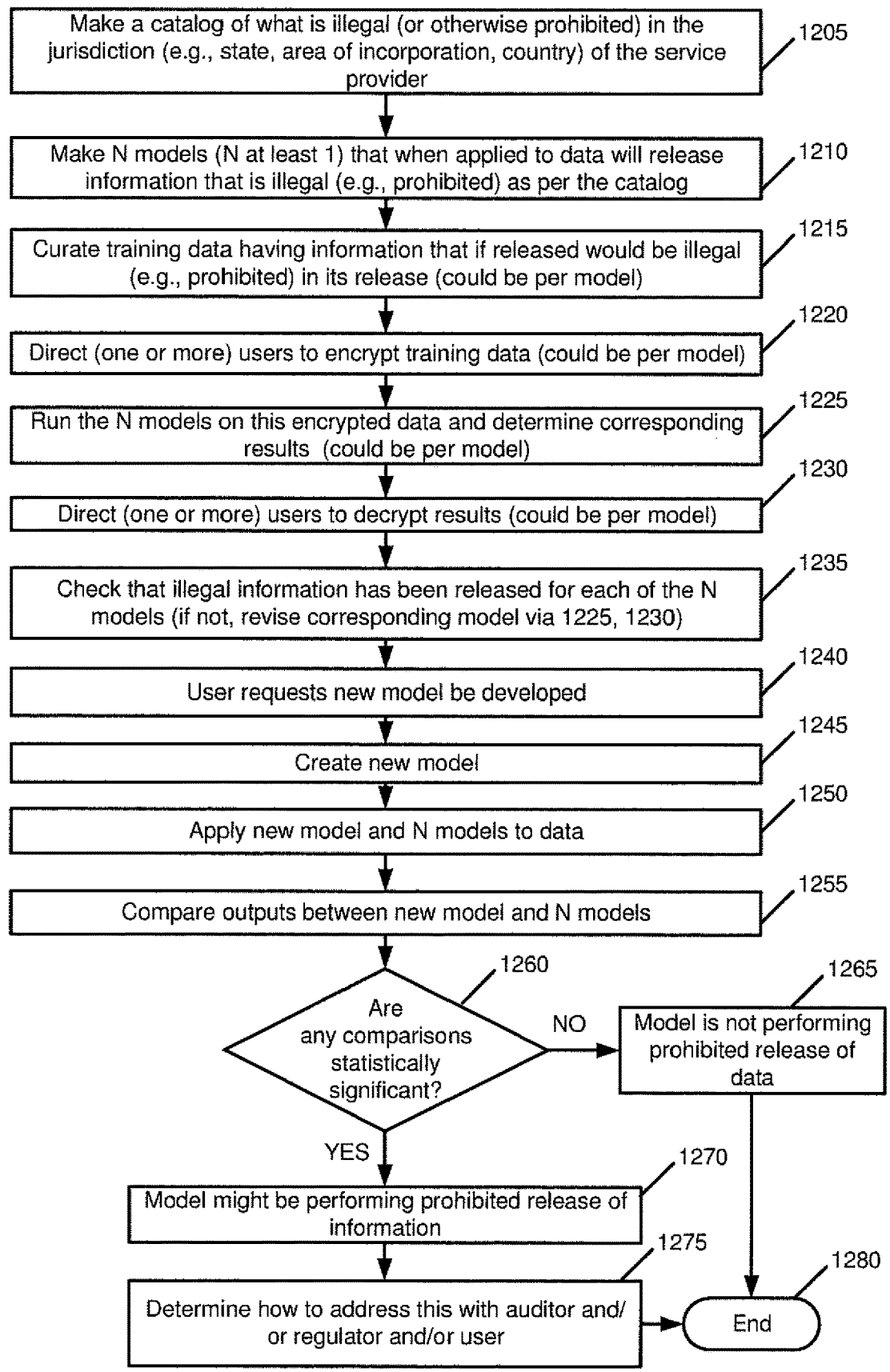
FIG. 12 an exemplary method for searching over an encrypted model using secure single-party learning to determine whether the encrypted model releases information that is prohibited from being released.

Another exemplary use concerns whether the service provider is using an encrypted model that releases information that is prohibited from being released. The auditor or regulator as auditor/regulator 920 causes the service provider 770 to perform actions to determine whether the encrypted model releases such information. FIG. 12 is an example of this use. The auditor or regulator as auditor/regulator 920 can be an entity such as law enforcement, a corporate entity, or another entity having the ability to control the actions of the service provider 770.

Turning to FIG. 11A, this figure is a flowchart of an exemplary method for searching over encrypted data using secure single-party learning to determine whether objectionable material is being used by a single user. There may be service-level agreements between the service provider 770 and the user 710 storing data on the service provider that requires the user 710 to perform actions so that the service provider 770 can determine whether any objectionable material is stored by the user on the service provider. For instance, the objectionable material may be prohibited by law, such as being pornography. In this example, the service provider 770 performs the operations in the corresponding blocks, e.g., under control of the homomorphic learning and inferencing module 750. The auditor/regulator 920 may cause the actions on the part of the service provider 770 to be performed, or the service provider 770 could perform the actions solely under its own control.

In block 1105, the service provider 770 curates training data of objectionable material (e.g., data and label pairs 888). This may also be performed by or caused by the auditor/regulator 920. The service provider 770 in block 1110 directs a user to encrypt the training data with their own key (or the service provider 770 may use the public key of the user to perform the encryption). The service provider 770 creates and trains an encrypted model 883 with this training data in block 1115, e.g., using the techniques described above.

Once the encrypted model 883 has been trained into the trained combined AI model 870, the service provider 770 runs the trained model on, e.g., provided and/or stored user data and determines the results in block 1120. It may be, for instance, that the user's data is only use for training and subsequent analysis and is not stored by the service provider 770, or the service provider 770 could store data previously used from the user for either training or analysis purposes. The service provider 770 in block 1125 directs this user 710 to decrypt the results and releases the cleartext results, e.g., to the service provider. It may be that the user submits the results to the service provider 770. It may be, instead, that the user 710 sends the results to the auditor/regulator 920, in the case where the user does not want the service provider 770 to review the material. The service provider 770 (or auditor or regulator as auditor/regulator 920) can determine whether the data is objectionable or not and take appropriate action. See block 1130. For instance, if no objectionable material is found, the service provider 770 does not have to take any action. On the other hand, if objectionable material is found, the service provider 770 can take action such as suspending the user's use of the model, alerting authorities (including or limited to the auditor/regulator 920) to the objectionable material, removing the material if stored, and the like.

Referring to FIG. 11B, this figure is a flowchart of an exemplary method for searching over encrypted data using secure multi-party learning to determine whether objectionable material is being used by one or more of N users. FIG. 11B is performed for multiple ones of the M users 710, and is performed by the service provider 770, e.g., under control of the homomorphic learning and inferencing module 750. The auditor/regulator 920 may also perform some of these blocks, or cause the service provider 770 to perform the blocks.

In block 1135, the service provider 770 curates training data of objectionable material (e.g., data and label pairs 888). This may also be performed by or caused by the auditor or regulator as the auditor/regulator 920. The service provider 770 in block 1140 directs each of the N users 710 to encrypt the training data with their own key. It is also possible for the service provider 770 to use the public keys of the N users 710 to encrypt the training data into the FHE domain. In block 1145, the service provider 770 creates and trains a model 883 with this training data to create a trained model 870, using the techniques described above. Note that this training is likely additional training to a model that has already been trained. That is, the encrypted model has been previously trained as described above and is being further trained with data comprising objectionable material.

In block 1150, the service provider 770 has the N−1 users 710 perform round-robin encryption of the learned outputs into the MFHE domain. See also block 625 of FIG. 9B. The service provider 770 in block 1155 performs output aggregation in the MFHE domain (see also block 646 of FIG. 9B). The service provider 770 in block 1160 causes round-robin decryption to be performed by N−1 users (see also blocks 650 of FIG. 9B). The service provider 770 then performs a combined model update in block 1165 (and see block 660 of FIG. 9B too). The service provider 770 in block 1170 runs the trained model on (e.g., stored and/or provided) user data from the N users and determines the results. In block 1175, the service provider 770 direct one or more of the N users 710 to decrypt the results and release the cleartext results, e.g., to the service provider 770 (e.g., and/or to the auditor/regulator 920). The service provider 770 then can determine whether the data is objectionable or not and take appropriate action. For instance, if no objectionable material is found, the service provider 770 does not have to take any action. On the other hand, if objectionable material is found, the service provider 770 can take action such as suspending the user's use of the model, alerting authorities (including or limited to the auditor/regulator 920), removing the material, and the like. It is noted that block 1180 may also be performed by an auditor or regulator as auditor/regulator 920.

FIG. 12 an exemplary method for searching over an encrypted model using secure single-party learning to determine whether the encrypted model releases information that is prohibited from being released. This method tries to determine whether a model itself is releasing information that should not be released. This method is performed by the service provider 770, but may also be performed by the auditor/regulator 920 or under direction of the auditor/regulator 920. For ease of reference, FIG. 12 is assumed to be performed by the service provider 770. Note that since the data is encrypted, it is a challenge for the service provider 770 to determine whether information that is prohibited from being released is actually being released. One way to do this is for the service provider 770 to create models that are known to release the data (still in an encrypted format), then to compare using statistics outputs of a model known to release prohibited information with outputs of a model created by a user.

In block 1205, the service provider 770 makes a catalog of what is illegal in the jurisdiction (e.g., state, area of incorporation, country) of the service provider. For instance, it may be illegal to release information such as medical diagnosis (such as cancer), sexual orientation, or the like, e.g., if a person's name is also released. The catalog may be, e.g., a list of information that is illegal. The jurisdiction may be informed by any legal entity such as a police force, any state or federal laws or regulations, or the like. The information that is released may simply be prohibited by an entity instead of being illegal.

The service provider 770 in block 1210 makes N models (N at least 1) that when applied to particular data will release information that is illegal (e.g., prohibited) as per the catalog. For instance, the particular data could be or comprise health records, and the prohibited data could be or comprise a health diagnosis such as cancer. The N models may also be trained as previously described or tested, e.g., to ensure the models actually release the prohibited information. Such testing may include blocks 1215-1235. The service provider 770 curates in block 1215 training data having information that if released would be illegal (e.g., prohibited) by its release. In block 1220, the service provider 770 directs (one or more) users to encrypt this training data. The service provider 770 in block 1230-1225 runs the N models on this encrypted data and determines corresponding results, and in block 1230 directs the (one or more) users to decrypt the results of running the model(s).

Note that blocks 1215, 1220, 1225, and 1230 could all be per model. That is, if there are five models, then blocks 1215-1230 would be run for each model. It is noted that one or more of the five models might be able to use the same training data. For example, if gender and a medical diagnosis of cancer are prohibited for two different models, the training information could include both of these as a set of medical information, although the models might be different (e.g., one looking for gender and one for a medical diagnosis of cancer).

In block 1235, the service provider 770 checks that illegal (e.g., prohibited) information has been released for each of the N models. This checks to ensure the model is designed correctly to release the prohibited information. If the prohibited information has not been released, the corresponding model is revised accordingly, using blocks 1225, 1230, and 1235.

At some point, a user 710 requests (block 1240) that a new model be developed by the service provider 770. The service provider 770 creates the new model, e.g., using previously stored and/or new (encrypted) training data from the user 710 in block 1245. In block 1250, after the model has been created (e.g., to the user's satisfaction), the service provider 770 applies the new model and the N models to data (e.g., from the user and/or from the training data used to train a corresponding one of the N models).

In block 1255, the service provider 770 compares outputs between the new model and N models. In block 1260, it is determined whether any comparisons are statistically significant. Note that some metric of statistical significance is used, because the output of the model is still encrypted for both the new and N models. Thus, the outputs cannot be directly compared in cleartext. If none of the comparisons is statistically significant (NO), in block 1265, the service provider 770 determines the model is not performing prohibited release of data and the flow ends in block 1280.

If one or more of the comparisons are statistically significant (YES), in block 1270, the service provider 770 determines the model might be performing prohibited release of information. In block 1275, the service provider 770 determines how to address this with auditor and/or regulator and/or user. For instance, the service provider 770 could ask the user to decrypt the output of the model where the output was statistically significant. This would allow the service provider 770 to verify the user's model actually is outputting prohibited data. The service provider 770 could then determine what should be done via discussions with an auditor or regulator and possibly with the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    accessing, by a computer system, training data curated to include information prohibited from release;
    accessing one or more machine learning models that, when applied to the training data, releases the information that is prohibited, wherein the one or more machine learning models comprise N machine learning models, where N is at least 1, and wherein the method further comprises testing the N machine learning models at least by,
    directing, by the computer system, one or more users to encrypt at least the training data, to form encrypted training data, in individual fully homomorphic encryption (FHE) domains corresponding to the one or more users;
    running by the computer system the N machine learning models on the encrypted training data, the running determining first encrypted results;
    comparing, by the computer system using a metric, the first encrypted results with second encrypted results of a further machine learning model, different from the N machine learning models, run on at least the encrypted training data, wherein the comparing the first encrypted results with the second encrypted results further comprises determining whether the further machine learning model is performing prohibited release of the information; and
    taking one or more actions to address the prohibited release of the information based on the determination that the further machine learning model is performing the prohibited release of the information.

2. The method of claim 1, wherein the prohibited release of information is further addressed with one or both of an auditor or regulator.

3. The method of claim 1, further comprising, in response to at least one user of the one or more users requesting the further machine learning model be created, performing the creating the further machine learning model.

4. The method of claim 1, further comprising
    directing the at least one user to decrypt the first encrypted results of the N machine learning models into plaintext; and
    checking, using the plaintext, that prohibited information has been released for one or more of the N machine learning models.

5. The method of claim 4, wherein the testing further comprises re-checking the one or more of the N machine learning models that did not release prohibited information, running by the computer system the one or more of the N machine learning models that did not release prohibited information on the encrypted training data and determining corresponding results, directing the at least one user to decrypt the corresponding results of the one or more of the N machine learning models that did not release prohibited information into plaintext, and checking, using the plaintext of the decrypted corresponding results, that prohibited information has been released for the one or more of the N machine learning models that did not release prohibited information.

6. The method of claim 1, wherein the computer system curates the training data that has been curated to have the information whose release is prohibited.

7. The method of claim 1, wherein the training data forms at least part of a catalog having a list of what is prohibited from release in a jurisdiction.

8. The method of claim 1, wherein the training data forms at least part of a catalog having a list of what is illegal if release in a jurisdiction.

9. A computer system, comprising:
    a memory comprising program code; and
    one or more processors, the one or more processors, in response to retrieval and execution of the program code, causing the computer system to perform operations comprising:
        accessing, by a computer system, training data curated to include information prohibited from release;
        accessing one or more machine learning models that, when applied to the training data, releases the information that is prohibited, wherein the one or more machine learning models comprise N machine learning models, where N is at least 1, and wherein the method further comprises testing the N machine learning models at least by,
        directing, by the computer system, one or more users to encrypt at least the training data, to form encrypted training data, in individual fully homomorphic encryption (FHE) domains corresponding to the one or more users;
        running by the computer system the N machine learning models on the encrypted training data, the running determining first encrypted results;
        comparing, by the computer system using a metric, the first encrypted results with second encrypted results of a further machine learning model, different from the N machine learning models, run on at least the encrypted training data, wherein the comparing the first encrypted results with the second encrypted results further comprises determining whether the further machine learning model is performing prohibited release of the information; and taking one or more actions to address the prohibited release of the information based on the determination that the further machine learning model is performing the prohibited release of the information.

10. The computer system of claim 9, wherein the prohibited release of information is further addressed with one or both of an auditor or regulator.

11. The computer system of claim 9, wherein the one or more processors, in response to retrieval and execution of the program code, further cause the computer system to perform operations comprising: in response to at least one user of the one or more users requesting the further machine learning model be created, performing the creating the further machine learning model.

12. The computer system of claim 9, directing the at least one user to decrypt the first encrypted results of the N machine learning models into plaintext; and checking, using the plaintext, that prohibited information has been released for one or more of the N machine learning models.

13. The computer system of claim 12, wherein the testing further comprises re-checking the one or more of the N machine learning models that did not release prohibited information, running by the computer system the one or more of the N machine learning models that did not release prohibited information on the encrypted training data and determining corresponding results, directing the at least one user to decrypt the corresponding results of the one or more of the N machine learning models that did not release prohibited information into plaintext, and checking, using the plaintext of the decrypted corresponding results, that prohibited information has been released for the one or more of the N machine learning models that did not release prohibited information.

14. The computer system claim 9, wherein the computer system curates the training data that has been curated to have the information whose release is prohibited.

15. The computer system of claim 9, wherein the training data forms at least part of a catalog having a list of what is prohibited from release in a jurisdiction.

16. The computer system of claim 9, wherein the training data forms at least part of a catalog having a list of what is illegal if release in a jurisdiction.

17. A computer program product comprising a computer readable storage medium having program instructions embodied therewith, the program instructions executable by a device to cause the device to perform operations comprising:

accessing, by a computer system, training data curated to include information prohibited from release;

accessing one or more machine learning models that, when applied to the training data, releases the information that is prohibited, wherein the one or more machine learning models comprise N machine learning models, where N is at least 1, and wherein the method further comprises testing the N machine learning models at least by, directing, by the computer system, one or more users to encrypt at least the training data, to form encrypted training data, in individual fully homomorphic encryption (FHE) domains corresponding to the one or more users;

running by the computer system the N machine learning models on the encrypted training data, the running determining first encrypted results;

comparing, by the computer system using a metric, the first encrypted results with second encrypted results of a further machine learning model, different from the N machine learning models, run on at least the encrypted training data, wherein the comparing the first encrypted results with the second encrypted results further comprises determining whether the further machine learning model is performing prohibited release of the information; and taking one or more actions to address the prohibited release of the information based on the determination that the further machine learning model is performing the prohibited release of the information.

* * * * *